US010679513B2

(12) United States Patent
Delisle

(10) Patent No.: US 10,679,513 B2
(45) Date of Patent: Jun. 9, 2020

(54) SIMULATION SERVER CAPABLE OF CREATING EVENTS OF A LESSON PLAN BASED ON SIMULATION DATA STATISTICS

(71) Applicant: CAE INC, Saint-Laurent (CA)

(72) Inventor: Jean-François Delisle, Saint-Laurent (CA)

(73) Assignee: CAE Inc., St-Laurent (CA)

( * ) Notice: Subject to any disclaimer, the term of this patent is extended or adjusted under 35 U.S.C. 154(b) by 633 days.

(21) Appl. No.: 15/046,116

(22) Filed: Feb. 17, 2016

(65) Prior Publication Data

US 2017/0236439 A1    Aug. 17, 2017

(30) Foreign Application Priority Data

Feb. 17, 2016  (CA) ...................................... 2920981

(51) Int. Cl.
*G09B 9/02* (2006.01)
*G06N 5/04* (2006.01)
*G09B 7/02* (2006.01)
*G09B 5/12* (2006.01)
*G09B 7/00* (2006.01)

(52) U.S. Cl.
CPC ............ *G09B 9/02* (2013.01); *G06N 5/046* (2013.01); *G09B 5/125* (2013.01); *G09B 7/00* (2013.01); *G09B 7/02* (2013.01)

(58) Field of Classification Search
CPC .................................... G09B 9/02; G09B 5/00
See application file for complete search history.

(56) References Cited

U.S. PATENT DOCUMENTS 5,260,874 A  *  11/1993  Berner ..................... G09B 9/24
                                                    434/242
6,106,297 A     8/2000  Pollak et al.
(Continued)

FOREIGN PATENT DOCUMENTS

CA       2888192        4/2014
WO   WO 2010044982     4/2010
(Continued)

OTHER PUBLICATIONS

European Search Report dated Jun. 6, 2019 for corresponding EP application no. 17752590.4.

*Primary Examiner* — Reginald A Renwick
(74) *Attorney, Agent, or Firm* — Benoit Yelle; Gowling WLG (Canada) LLP

(57) ABSTRACT

A simulation server capable of creating events of a lesson plan based on simulation data statistics. The simulation server comprises memory for storing simulation data, and a processing unit. The processing unit executes a plurality of simulations functionalities according to a lesson plan. The processing unit collects simulation data representative of the execution of the plurality of simulations functionalities according to the lesson plan. The processing unit stores the simulation data in the memory. The processing unit processes the simulation data to generate simulation data statistics. The processing unit creates at least one event having at least one rule based on the simulation data statistics. The at least one rule consists in at least one measurable value to be measured by at least one of the simulation functionalities.

13 Claims, 17 Drawing Sheets

(56) References Cited

U.S. PATENT DOCUMENTS

| | | |
|---|---|---|
| 7,346,437 B2 | 3/2008 | Petillon |
| 8,665,121 B2 | 3/2014 | Shavit |
| 8,770,977 B2 | 7/2014 | Slayton et al. |
| 2002/0072414 A1 | 6/2002 | Stylinski et al. |
| 2003/0214533 A1 | 11/2003 | Cull et al. |
| 2008/0214253 A1 | 9/2008 | Gillo |
| 2009/0220929 A1 | 9/2009 | Daniel |
| 2009/0319238 A1 | 12/2009 | Bedard |
| 2009/0325131 A1 | 12/2009 | Cernasov et al. |
| 2010/0100520 A1 | 4/2010 | Dargue et al. |
| 2010/0266991 A1 | 10/2010 | Gregoire et al. |
| 2012/0172100 A1* | 7/2012 | Colar ............... G09B 7/06 |
| | | 463/9 |
| 2012/0208153 A1 | 8/2012 | Bolla et al. |
| 2012/0216142 A1 | 8/2012 | Bock et al. |
| 2013/0218823 A1 | 8/2013 | Ferrand |
| 2013/0324245 A1 | 12/2013 | Harvey |
| 2014/0109113 A1 | 4/2014 | Stacy et al. |
| 2014/0186810 A1 | 7/2014 | Falash et al. |
| 2014/0315166 A1 | 10/2014 | Williams et al. |
| 2014/0337429 A1 | 11/2014 | Asenjo et al. |
| 2015/0039551 A1 | 2/2015 | Huet et al. |
| 2015/0111180 A1 | 4/2015 | Wheller et al. |
| 2015/0199917 A1* | 7/2015 | French ............... G09B 19/0038 |
| | | 434/247 |
| 2016/0019808 A1 | 1/2016 | Chavez et al. |
| 2016/0077547 A1* | 3/2016 | Aimone ............... G06F 3/012 |
| | | 345/8 |
| 2017/0148340 A1* | 5/2017 | Popa-Simil ............... G09B 9/48 |
| 2017/0236438 A1* | 8/2017 | Delisle ............... G09B 9/02 |
| | | 434/362 |

FOREIGN PATENT DOCUMENTS

| | | |
|---|---|---|
| WO | 2015143530 A1 | 10/2015 |
| WO | 2015158432 A1 | 10/2015 |

* cited by examiner

SIMULATION SERVER CAPABLE OF CREATING EVENTS OF A LESSON PLAN BASED ON SIMULATION DATA STATISTICS

TECHNICAL FIELD

The present disclosure relates to the field of simulators. More specifically, the present disclosure relates to a simulation server capable of creating events of a lesson plan based on simulation data statistics.

BACKGROUND

Flight simulators are used by commercial airlines and air forces to train their pilots to face various types of situations. A simulator is capable of simulating various functionalities of an aircraft, and of reproducing various operational conditions of a flight (e.g. takeoff, landing, hovering, etc.). A trainee (e.g. a pilot performing a training session) interacts with the simulator to control various functionalities of the simulated aircraft during a simulation executed by the simulator. Similarly, an instructor (e.g. an experienced pilot) may interact with the simulator for various purposes, including controlling a simulation currently executed by the simulator, creating or updating simulation scenarios, controlling the simulation environment of a trainee, etc.

A particular simulation scenario executed by the simulator generally consists of a set of pre-determined events occurring during the execution of the particular simulation scenario by the simulator. The results of the simulation scenario are exported as a log file comprising simulation data and corresponding times of occurrence for the simulation data. The evaluation of a trainee who has performed the simulation scenario is based on an interpretation of the log file by an instructor, and on visual subjective observations performed by the instructor during the simulation.

One issue related to the evaluation is its subjectivity, since two different instructors may make different visual observations and interpret the same log file differently. Another issue related to the simulation scenario is its lack of flexibility, since a particular simulation scenario may only be varied by having the instructor manually introduce new challenges for the trainee in the course of the simulation. Furthermore, it is not possible to evaluate objectively a trainee's progress and difficulties, since the evaluation is only based on the log file currently at hand, for which an interpretation by an instructor is completely subjective.

One solution to this issue is to define events having at least one rule which can be measured or verified, and to further define a target value of the rule. For each event, the values of the corresponding rules are measured during the execution of a simulation according to a lesson plan comprising the events, and the measured values are compared to their target values. Furthermore, the definition of events and corresponding rules may be automated, using simulation data collected from previously executed simulations.

Therefore, there is a need for a simulation server capable of creating events of a lesson plan based on simulation data statistics.

SUMMARY

According to a first aspect, the present disclosure provides a simulation server. The simulation server comprises memory for storing simulation data, and a processing unit. The processing unit executes a plurality of simulations functionalities according to a lesson plan. The processing unit collects simulation data representative of the execution of the plurality of simulations functionalities according to the lesson plan. The processing unit stores the simulation data in the memory. The processing unit processes the simulation data to generate simulation data statistics. The processing unit creates at least one event having at least one rule based on the simulation data statistics. The at least one rule consists in at least one measurable value to be measured by at least one of the simulation functionalities.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the automatic creation by a simulation server of events of a new lesson plan, based on simulation data statistics collected during the execution by the simulation server of a plurality of simulations functionalities according to a previously defined lesson plan. Although the examples provided in the rest of the disclosure are in the field of aircraft simulators, the teachings of the present disclosure can also be applied to simulators of terrestrial vehicles such as tanks, maritime vehicles such as boats, etc. The simulators may also perform a real time simulation of an underground system, a mining facility, a nuclear plant, a human body, etc.

Simulation Server

Figure 1:
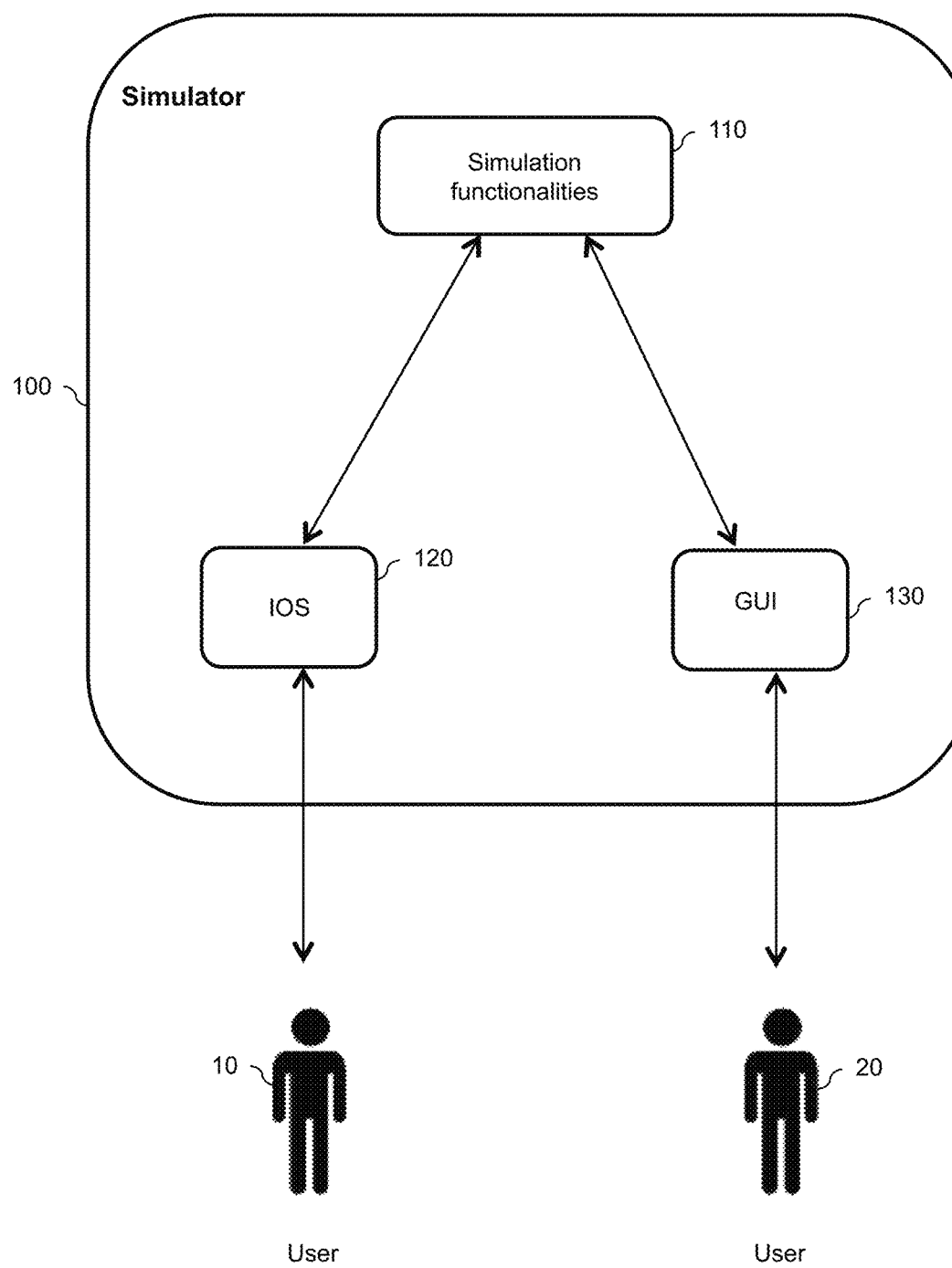
FIG. 1 illustrates a legacy simulator configuration.

Referring now to FIG. 1, a legacy simulator 100 is represented. The simulator 100 executes a simulation. The execution of the simulation is generally performed in real time and encompasses a plurality of functions, which are performed sequentially or concurrently.

The execution of the simulation comprises executing one or more simulation functionalities 110. In the case of an aircraft simulator, examples of simulation functionalities 110 include simulations of the following components of the aircraft: simulation of the engines, simulation of the landing gear, simulation of the electrical circuits, simulation of the hydraulic circuits, simulation of the cockpit, etc. Furthermore, the execution of particular simulation functionality 110 may trigger the display of generated simulation data (e.g. in the form of a navigation map, a radar map, a weather map, a flight map, aircraft data, etc.) on a display of the simulator 100. Simulation functionalities 110 can be implemented separately in software modules executed by the simulator 100, or grouped per category of equipment, type of simulation, etc. into larger software modules. The simulator 100 is capable of executing several simulation functionalities 110 in parallel, to perform an exhaustive simulation of the aircraft. Alternatively, the simulator 100 executes a single simulation functionality 110 (or a limited number of simulation functionalities 110) to perform a restricted simulation of the aircraft, focusing on specific systems and sub-systems of the aircraft (e.g. only the engines, only the engines and landing gear in combination, etc.).

The execution of the simulation also comprises executing a simulator Graphical User Interface (GUI) functionality 130. The simulator GUI functionality 130 allows a user 20 (for example a trainee) to interact with the simulator 100, and more specifically with the simulation functionalities 110 currently executed by the simulator 100. In the case of an aircraft simulator, the simulator GUI functionality 130 comprises displaying simulation data generated by the simulation functionalities 110 on one or more displays of the simulator 100. The displayed simulation data may include flight parameters (e.g. altitude, speed, etc.), aircraft parameters (e.g. remaining fuel, alarms, etc.), maps (e.g. navigation map, weather map, radar map, etc.), virtual controls, out-of window information, etc. The simulator GUI functionality 130 also comprises receiving interactions from the user 20 via one or more user interfaces of the simulator 100. The user interface(s) may include traditional computer user interfaces (e.g. a keyboard, a mouse, a trackpad, a touch screen, etc.), as well as dedicated simulation user interfaces (e.g. switches, simulation command controls, joysticks, etc.). The interactions received from the user 20 are processed by the simulation functionalities 110, and affect the simulation of one or more systems of the aircraft.

The execution of the simulation also comprises executing an Instructor Operating Station (IOS) functionality 120. The IOS functionality 120 allows a user 10 (for example an instructor) to interact with the simulator 100, and more specifically with the simulation functionalities 110 currently executed by the simulator 100. For instance, IOS User Interface (UI) pages are displayed on a display of the simulator 100, allowing the user 10 to control in real time the execution of a particular simulation scenario executed by the simulation functionalities 110. The IOS 120 comprises graphical control elements (e.g. menus and sub-menus, list boxes, etc.) for controlling the execution of the simulation (e.g. modifying simulation parameters) and graphical display elements (e.g. images, text fields, icons, embedded videos, etc.) for displaying simulation data generated by the simulation functionalities 110. In the case of an aircraft simulator, the user 10 interacts with the IOS 120 via one or more user interfaces (e.g. a keyboard, a mouse, a trackpad, a touch screen, etc.) to configure and/or update simulation parameters (e.g. weather conditions, flight plan, etc.). The configured/updated simulation parameters are processed by the simulation functionalities 110, and affect the simulation of one or more systems of the aircraft.

In a particular embodiment, the execution of the simulation also comprises executing at least one proxy function (not represented in FIG. 1). The proxy function allows other functionalities of the simulator 100 (e.g. IOS functionality 120 and simulator GUI functionality 130) to interact with the simulation functionalities 110. A plurality of proxy functions may be executed concurrently, each proxy function providing an interface to a specific functionality among the simulation functionalities 110.

Figure 2A:
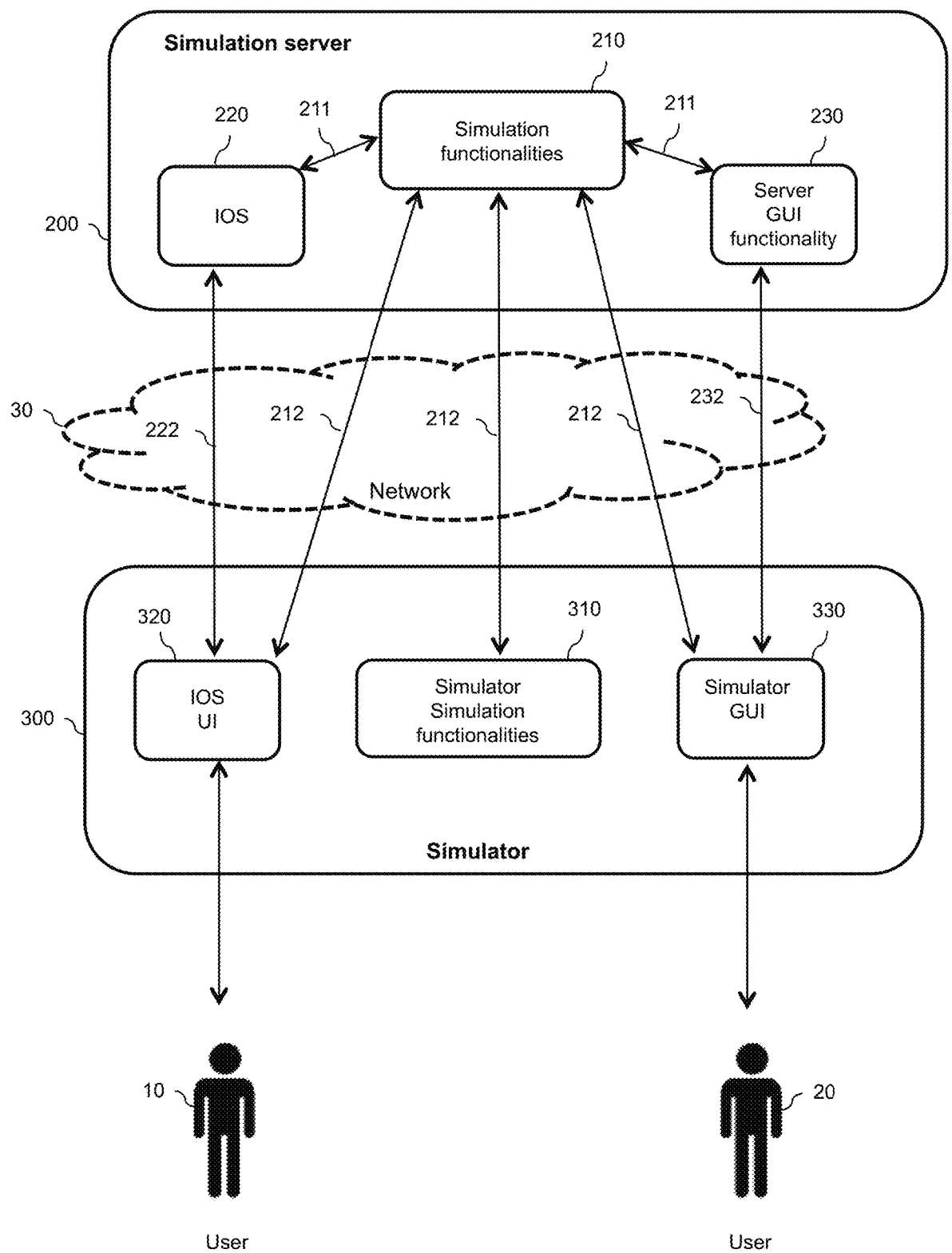
FIGS. 2A, 2B and 2C illustrate a simulation server interacting with a simulator and portable computing devices for executing a simulation.
Figure 2B:
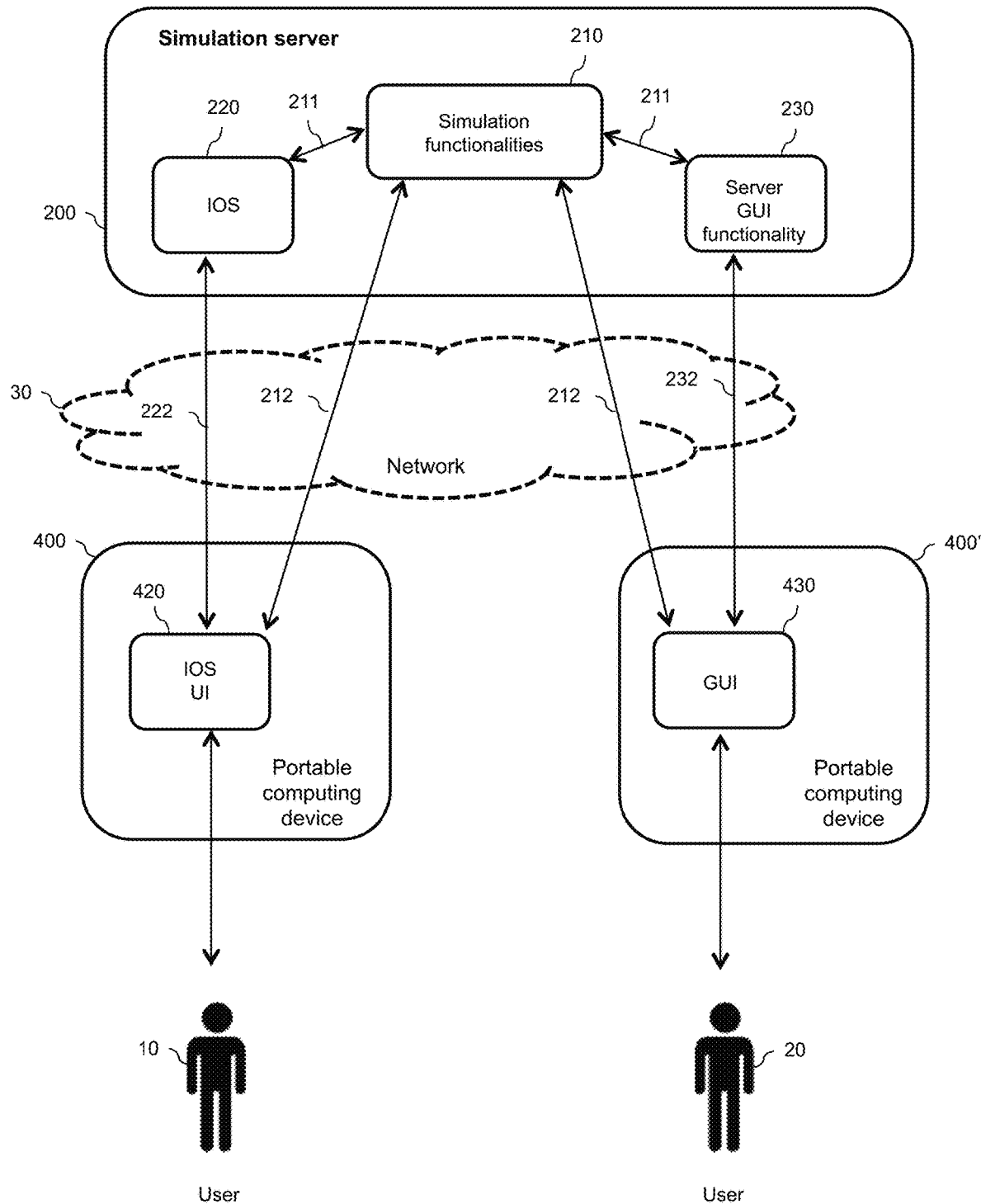
Figure 2C:
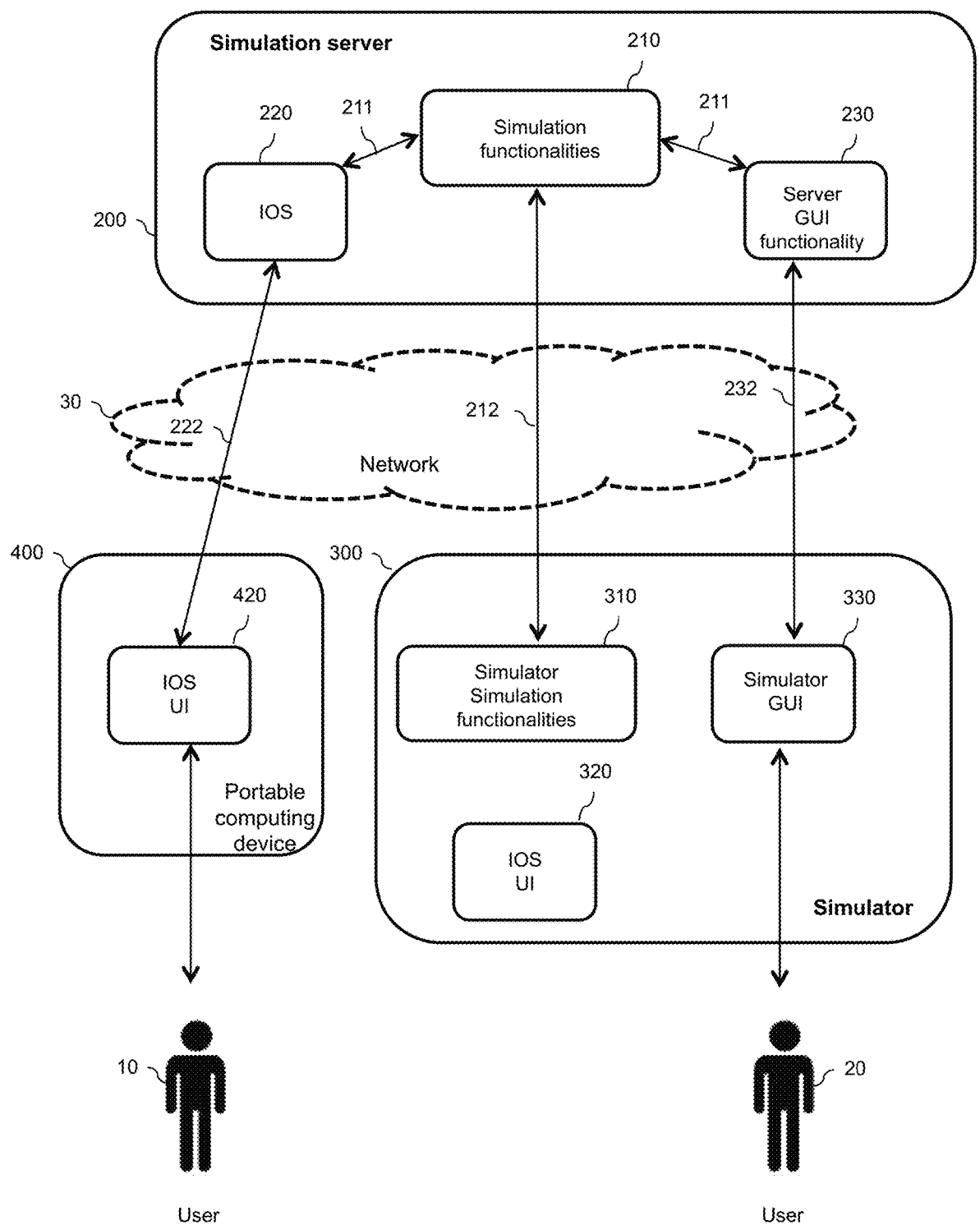

Referring now concurrently to FIGS. 2A, 2B and 2C, embodiments of a simulation server 200 and a simulator 300 in accordance with the present invention are represented. The present simulation server 200 and simulator 300 rely on sharing processing performed when executing a simulation between themselves.

The simulation server 200 executes a simulation, which comprises executing one or more server simulation functionalities 210, executing a server IOS functionality 220, and executing a server graphical user interface (GUI) functionality 230. The simulator 300 also executes the simulation, which comprises executing one or more simulator simulation functionalities 310, executing a simulator IOS User Interface (UI) 320, and executing a simulator graphical user interface (GUI) 330.

The simulation functionalities 110 of the legacy simulator 100 have been split between the server simulation functionalities 210 and the simulator simulation functionalities 310. The server simulation functionalities 210 perform the computations for simulating the operations of the simulated entity. The present simulation server 200 and simulator 300 may be used to simulate any type of entity, such as for example aircrafts, spatial shuttles, vessels, vehicles, etc. For simplicity purposes, the following description will provide examples related to aircrafts. Such examples are provided for example purposes only, and should not be construed to limit the scope of protection sought for the present simulation server 200 and simulator 300.

The server simulation functionalities 210 may perform computations for simulating components of the vehicle being simulated, for example engines, electrical circuits, hydraulic circuits, information shown and displayed to a user of the simulator, etc. The server simulation functionalities 210 generate simulation data 211, which are used locally by other functionalities implemented by the simulation server 200 (e.g. the server IOS functionality 220 and the server GUI functionality 230). The server simulation functionalities 210 also generate simulation data 212, which are transmitted to the simulator 300 through a communication network 30. The transmitted simulation data 212 can be used by the simulator GUI 330, the simulator IOS UI 320 and the simulator simulation functionalities 310, but may also be used by other functionalities implemented by the simulator 300 (this use case is not represented in FIG. 2A). The simulation data 212 include visual data in the form of static 2D or 3D simulation images, or a flow of 2D or 3D simulation images. Examples of visual data include a navigation map, a radar map, a weather map, a flight map, aircraft data, etc. For instance, a map may consist in a static 2D or 3D image, or a flow of 2D or 3D images corresponding to a real time streaming of the map. The visual data are displayed by at least one simulator GUI 330 and simulator IOS UI 320 on display(s) of the simulator 300. The simulation data 212 may also include actuation data, which are processed by the simulator simulation functionalities 310 for actuating physical component(s) of the simulator 300 (e.g. actuating hydraulic cylinders for moving a simulated control cabin representative of the entity). The simulator simulation functionalities 310 may also perform local computations for simulating some of the operations of the simulated entity, which are not performed by the server simulation functionalities 210. The simulator simulation functionalities 310 also generate feedback simulation data 212, which are transmitted to the simulation server 200 through the communication network 30. These feedback simulation data 212 are representative of an operational status of the simulator 300, and are used by the server simulation functionalities 210 as a feedback for taking into consideration the operational status of the simulator 300 when executing the simulation. For example, the server simulation functionalities 210 transmit simulation data 212 for actuating (by the simulator simulation functionalities 310) a physical component of the simulator 300, and the simulator simulation functionalities 310 transmit feedback simulation data 212 indicating that the activation of the physical component of the simulator 300 has been completed. Upon reception of the feedback simulation data 212, the server simulation functionalities 210 proceed with the next step in the execution of the simulation, taking into consideration the new operational status of the simulator 300.

The IOS functionality 120 of the legacy simulator 100 has also been split between the server IOS functionality 220 and the simulator IOS UI 320. The server IOS functionality 220 performs the computations related to the IOS functionality, while the simulator IOS UI 320 performs the interactions with a user 10. The server IOS functionality 220 generates IOS control and monitoring data 222, which are transmitted to the simulator 300 through the communication network 30. The IOS control and monitoring data 222 are used by the simulator IOS UI 320 for interacting with the user 10. The IOS control and monitoring data 222 includes IOS UI page(s), e.g. each IOS UI page corresponding to a user interface with sub-groups of instances, which are displayed on a display of the simulator 300 by the simulator IOS UI 320. The displayed IOS UI page(s) allow the user 10 to control in real time (at the simulator 300) the execution of a particular simulation scenario executed by the server simulation functionalities 210. More specifically, by interacting with the IOS UI 320, the user 10 generates IOS interaction data 222 (e.g. configuration, monitoring and/or update of simulation parameters), which are transmitted via the network 30 to the server IOS functionality 220. The server IOS functionality 220 interacts with the server simulation functionalities 210 by exchanging data 211. As mentioned previously, the data 211 include simulation data generated by the server simulation functionalities 210, and used by the server IOS functionality 220 for generating IOS UI pages(s), which are transmitted to the simulator IOS UI 320. The data 211 also include the configuration/update of simulation parameters received from the simulator IOS UI 320, which may be pre-processed by the server IOS functionality 220 before transmission to the server simulation functionalities 210. The server simulation functionalities 210 use the configuration/update of simulation parameters to control the execution of the simulation. As mentioned previously, the simulator IOS UI 320 also receives simulation data 212 (e.g. 2D or 3D maps) from the server simulation functionalities 210, displayed on display(s) of the simulator 300.

The simulator GUI functionality 130 of the legacy simulator 100 has also been split between the server GUI functionality 230 and the simulator GUI 330. The server GUI functionality 230 performs the computations related to the graphical representations to be displayed to the user 20, while the simulator GUI 330 performs the interactions with the user 20. The server GUI functionality 230 generates graphical user interface (GUI) graphical data 232, which are transmitted to the simulator 300 through the communication network 30. The GUI graphical data 232 are used by the simulator GUI 330 for interacting with the user 20. The GUI graphical data 232 include simulation parameters, events and information (e.g. entity parameters, events, maps, etc.), which are displayed on display(s) of the simulator 300 by the simulator GUI 330. The displayed GUI graphical data 232 allow the user 20 to interact in real time (at the simulator 300) with the execution of a particular simulation scenario executed by the server simulation functionalities 210. More specifically, based on the displayed GUI graphical data 232, the user 20 interacts with one or more user interfaces of the simulator 300. The simulator GUI 330 generates GUI interaction data 232 corresponding to the user 20 interactions, which are transmitted via the network 30 to the server GUI functionality 230. The server GUI functionality 230 interacts with the server simulation functionalities 210 by exchanging data 211. As mentioned previously, the data 211 include simulation data generated by the server simulation functionalities 210, and used by the server GUI functionality 230 for generating the simulation parameters, events and information transmitted to the simulator GUI 330. The data 211 also include the user 20 interactions received from the simulator GUI 330, which may be pre-processed by the server GUI functionality 230 before transmission to the server simulation functionalities 210. The server simulation functionalities 210 use the user 20 interactions to control the execution of the simulation. As mentioned previously, the simulator GUI 330 also receives simulation data 212 (e.g. 2D or 3D maps) from the server simulation functionalities 210, which are further displayed on the simulator 300 through the simulator GUI 330.

In a particular embodiment, at least one of the functionalities implemented by the legacy simulator 100 of FIG. 1 may not be deported on the simulation server 200, but fully implemented on the simulator 300. For example, the simulation server 200 does not include the server GUI functionality 230 and the simulator 300 includes the simulator GUI functionality 130 of the legacy simulator 100 in place of the simulator GUI 330. In this particular embodiment, the simulator GUI 130 is implemented on the simulator 300 and interacts directly with the server simulation functionalities 210 via the network 30. This embodiment is not represented in the Figures.

The network 30 may consist of a mobile network (e.g. a Wi-Fi network or cellular network), a fixed network (e.g. an Ethernet network), a combination thereof, etc. The network 30 may allow communications between devices over an Intranet, an Extranet, the global Internet, etc. The simulation server 200 and the simulator 300 both include a communication interface compatible with the network 30, for exchanging data over the network 30. For example, the simulation server 200 and the simulator 300 comprise a communication interface supporting both Wi-Fi and Ethernet, to easily adapt to a particular network 30 deployed at the premises where they are respectively operating.

Although not represented in FIG. 2A for simplification purposes, the server simulation functionalities 210 generally comprise a plurality of functions, for example a Weather function and a Navigation function (represented and described later with respect to FIG. 3A). The Navigation function of the server simulation functionalities 210 interfaces with other functionalities of the simulation server 200 (e.g. with the server GUI functionality 230 and with a dedicated IOS function IOS_1 (represented in FIG. 3A) of the server IOS functionality 220). Similarly, the Weather function of the server simulation functionalities 210 interfaces with other functionalities of the simulation server 200 (e.g. with the server GUI functionality 230 and with a dedicated IOS function IOS_2 (represented in FIG. 3A) of the server IOS functionality 220). As mentioned previously with respect to the legacy simulator represented in FIG. 1, a plurality of proxy functions may be used to interface the functions (e.g. Navigation and Weather respectively) of the server simulation functionalities 210 with other functionalities of the simulation server 200 (e.g. the server IOS functionality 220 and the server GUI functionality 230).

In the rest of the description, the simulation data 212 generated and transmitted by the server simulation functionalities 210 to the simulator 300 may be referred to as simulator simulation data. The IOS control and monitoring data 222 generated and transmitted by the server IOS functionality 220 to the simulator 300 may be referred to as simulator IOS control and monitoring data. The GUI graphical data 232 generated and transmitted by the server GUI functionality 230 to the simulator 300 may be referred to as simulator graphical data.

The IOS interaction data 222 generated and transmitted by the simulator IOS UI 320 to the simulation server 200 and the GUI interaction data 232 generated and transmitted by the simulator GUI 330 to the simulation server 200 may be referred to as simulator interaction data.

Referring now concurrently to FIGS. 2A and 2B, portable computing devices 400 and 400' are represented in FIG. 2B. The portable computing devices 400 and 400' implement some of the functionalities implemented on the simulator 300 represented in FIG. 2A.

The portable computing device 400 and 400' may consist in various types of computing devices having a form factor allowing easy carrying. Examples of such portable computing devices 400 and 400' include laptops, tablets, etc. The portable computing devices 400 and 400' both include a communication interface compatible with the network 30, for exchanging data with the simulation server 200 over the network 30.

The portable computing device 400 implements a portable computing device IOS UI 420 similar to the simulator IOS UI 320. The portable computing device IOS UI 420 exchanges IOS data 222 (IOS control and monitoring data, and IOS interaction data) with the server IOS functionality 220 over the network 30, in a similar manner as the simulator IOS UI 320. The portable computing device IOS UI 420 allows the user 10 to control in real time, via the portable computing device 400, the execution of a particular simulation scenario executed by the server simulation functionalities 210. The portable computing device IOS UI 420 also receives simulation data 212 (e.g. 2D or 3D maps) from the server simulation functionalities 210, which are further displayed on the portable computing device 400 through the portable computing device IOS UI 420.

In this configuration, the IOS functionality 120 of the legacy simulator 100 represented in FIG. 1 has been split between the server IOS functionality 220 and the portable computer device IOS UI 420. The server IOS functionality 220 performs the computations related to the IOS functionality, while the portable computing device IOS UI 420 performs the interactions with the user 10.

The server IOS functionality 220 is adapted for simultaneously or alternatively supporting interactions with the simulator IOS UI 320 and the portable computing device IOS UI 420. For example, the same user 10 can use the simulator IOS UI 320 during a first simulation session, and the portable computing device IOS UI 420 during a second simulation session, both sessions being performed by executing server simulation functionalities 210. In another example, a first user 10 uses the simulator IOS UI 320 during a simulation session (for controlling a first simulation functionality), and a second user 10 simultaneously uses the portable computing device IOS UI 420 during the same simulation session (for controlling a second simulation functionality), the simulation session being performed by executing the server simulation functionalities 210.

The portable computing device 400' implements a portable computing device graphical user interface (GUI) 430 similar to the simulator GUI 330. The portable computing device GUI 430 exchanges GUI graphical data and GUI interaction data 232 with the server GUI functionality 230 over the network 30, in a similar manner as the simulator GUI 330. The portable computing device GUI 430 allows the user 20 to interact in real time, via the portable computing device 400', with the execution of a particular simulation scenario executed by the server simulation functionalities 210. As mentioned previously, the portable computing device GUI 430 also receives and displays simulation data 212 (e.g. 2D or 3D maps) from the server simulation functionalities 210.

In this configuration, the simulator GUI functionality 130 of the legacy simulator 100 represented in FIG. 1 has been split between the server GUI functionality 230 and the portable computing device GUI 430. The server GUI functionality 230 performs the computations related to the graphical representations to be displayed to the user 10, while the portable computing device GUI 430 performs the interactions with the user 20.

The server GUI functionality 230 is adapted for simultaneously or alternatively supporting interactions with the simulator GUI 330 and the portable computing device GUI 430. For example, user 20 can use the simulator GUI 330 during a first training session, and the portable computing device GUI 430 during a second training session, both simulation sessions being performed by executing server simulation functionalities 210. In another example, a first user 20 uses the simulator GUI 330 during a simulation session (for interacting with a first simulation functionality 210), and a second user 20 simultaneously uses the portable computing device GUI 430 during the same simulation session (for interacting with a second simulation functionality 210), the simulation sessions being performed by executing the first and second server simulation functionalities 210.

In the rest of the description, the simulation data 212 generated and transmitted by the server simulation functionalities 210 to a portable computing device 400 or 400' may be referred to as portable computing device simulation data. The IOS control and monitoring data 222 generated and transmitted by the server IOS functionality 220 to a portable computing device 400 may be referred to as portable computing device IOS control and monitoring data. The GUI graphical data 232 generated and transmitted by the server GUI functionality 230 to a portable computing device 400' may be referred to as portable computing device graphical data. The IOS interaction data 222 generated and transmitted by the portable computing device IOS UI 420 to the simulation server 200 and the GUI interaction data 232 generated and transmitted by the portable computing device GUI 430 to the simulation server 200 may be referred to as portable computing device interaction data.

FIG. 2C illustrates another operational configuration of the simulation server 200 and simulator 300. In this particular configuration, the user 10 uses the portable computing device IOS UI 420 for controlling in real time (through the server IOS functionality 220) the execution of a particular simulation scenario executed by the server simulation functionalities 210. The user 20 uses the simulator GUI 330 for interacting in real time (through the server GUI functionality 230) with the execution of the same particular simulation scenario executed by the server simulation functionalities 210.

A person skilled in the art will readily understand that the usage of the simulation server 200 provides the required flexibility for implementing a plurality of other operational configurations involving the simulation server 200, the simulator 300 and portable computing device(s) (e.g. 400 and 400'), which have not been represented in the Figures for simplification purposes.

Figure 3A:
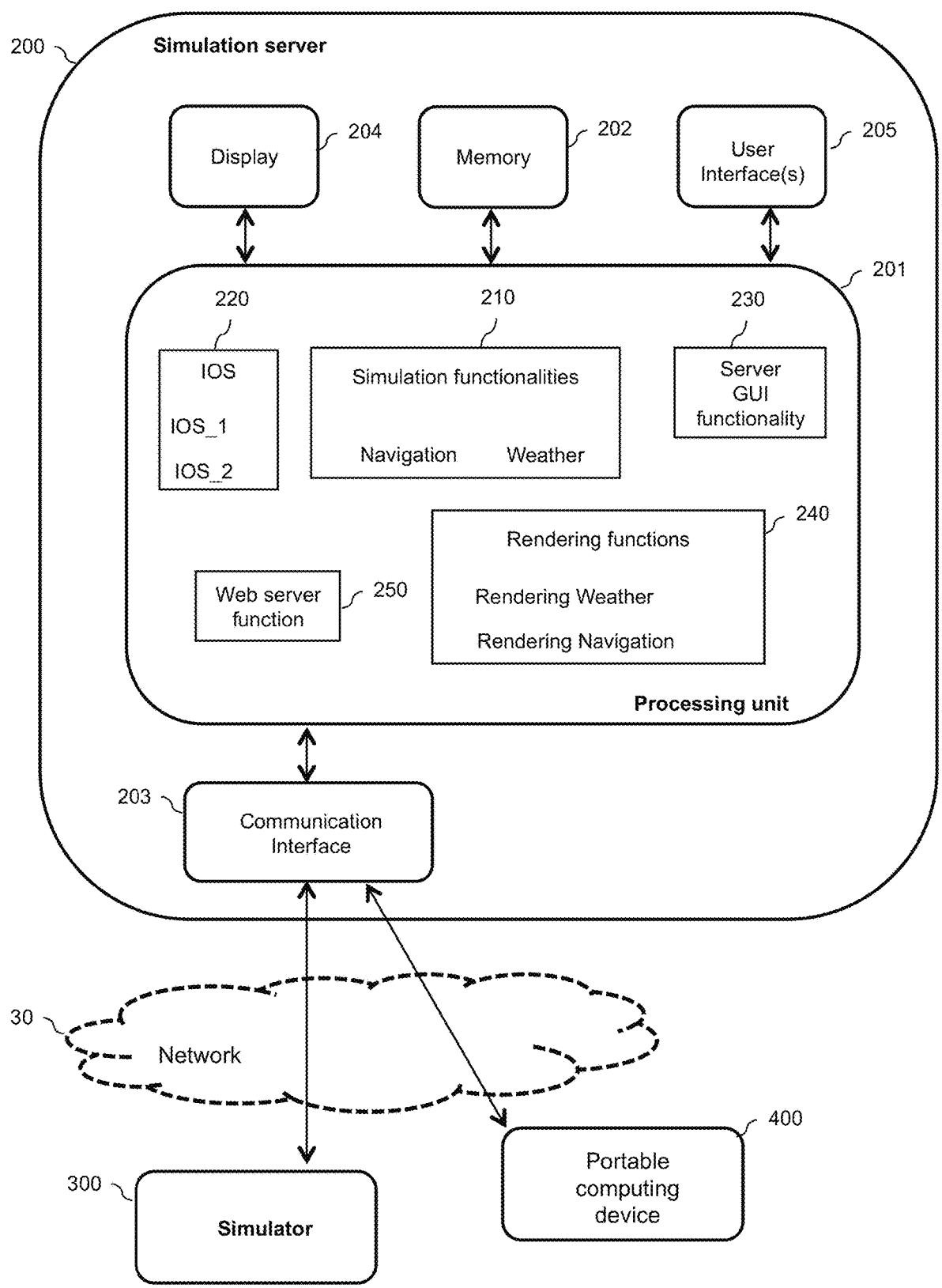
FIGS. 3A, 3B and 3C respectively illustrate exemplary embodiments of components and functionalities of the simulation server, simulator and portable computing devices of FIGS. 2A, 2B and 2C.
Figure 3B:
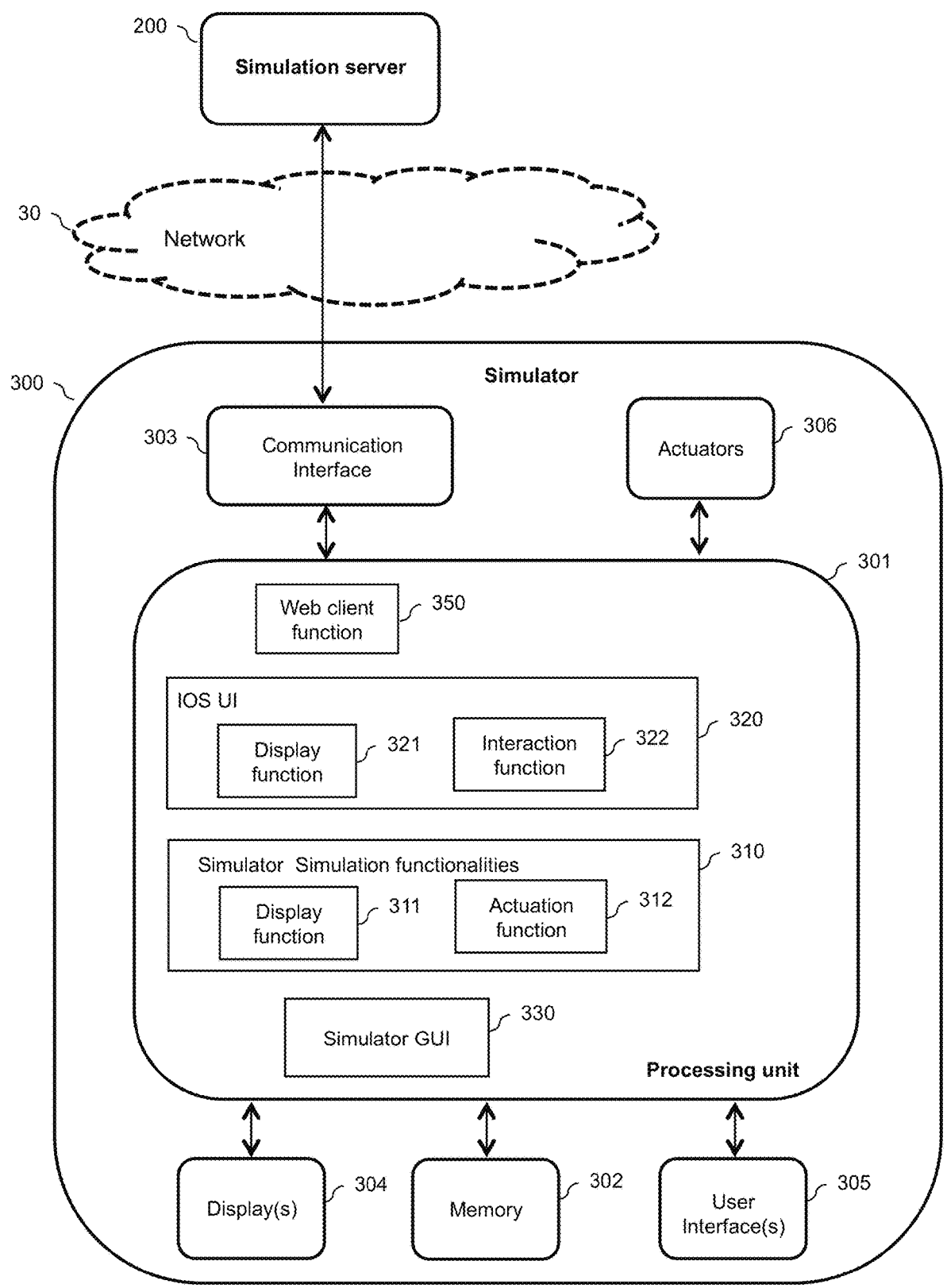
Figure 3C:
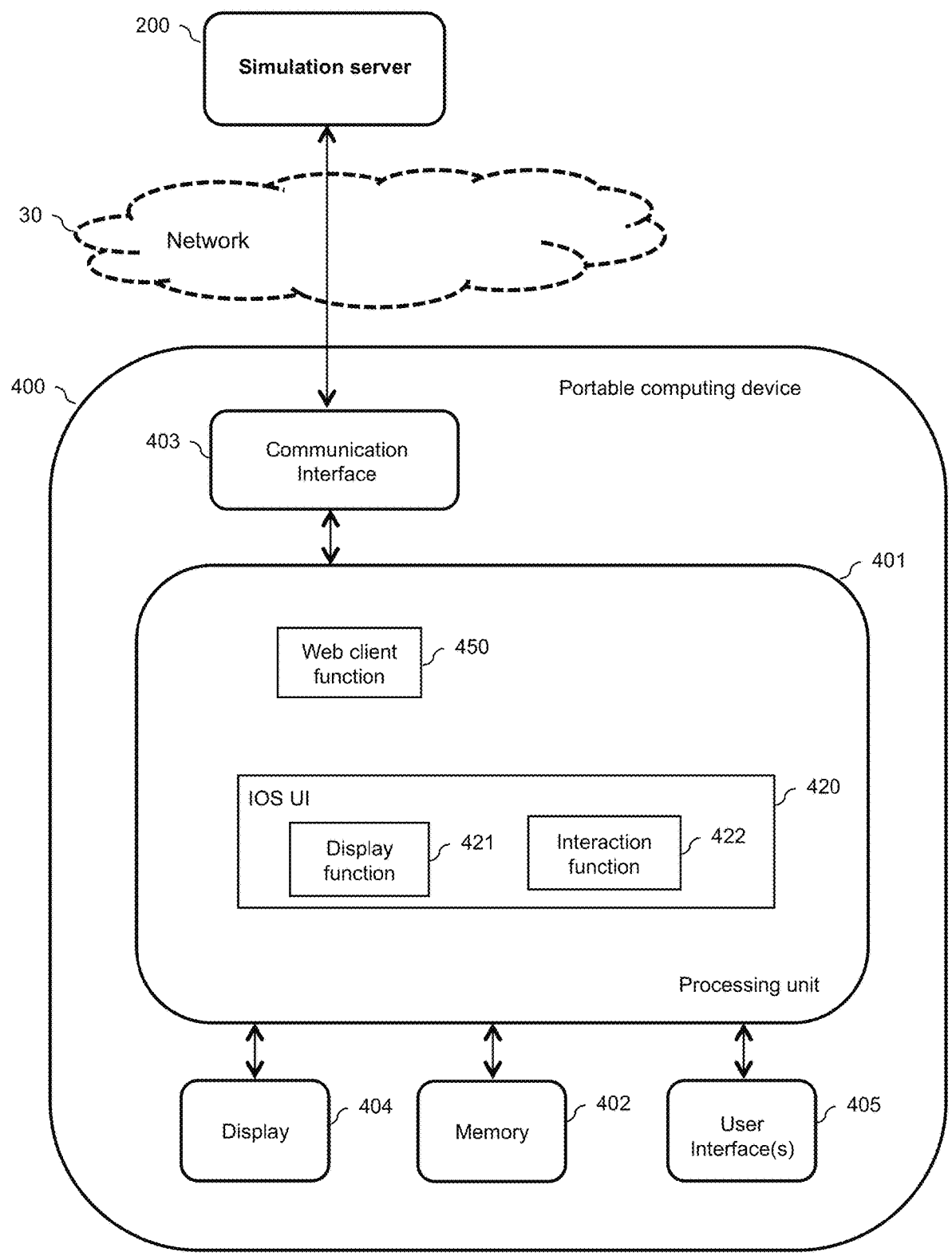

Referring now to FIGS. 3A, 3B and 3C, exemplary embodiments of components and functionalities of the simulation server 200, the simulator 300 and the portable computing device 400 are represented.

Referring more specifically to FIG. 3A, the simulation server 200 comprises a processing unit 201, having one or more processors (not represented in FIG. 3A for simplification purposes) capable of executing instructions of computer program(s). Each processor may further have one or several cores. The processing unit 201 implements functionalities of the simulation server 200 by executing computer program(s) instructions. The functionalities implemented by the processing unit 201 include the server simulation functionalities 210, the server IOS functionality 220 and the server GUI functionality 230.

The simulation server 200 comprises memory 202 for storing instructions of the computer program(s) executed by the processing unit 201, data generated by the execution of the computer program(s), data received via a communication interface 203, etc. The simulation server 200 may comprise several types of memories, including volatile memory, non-volatile memory, etc.

The simulation server 200 comprises the communication interface 203, for exchanging data with other devices, including one or more simulators 300 and/or one or more portable computing devices 400 via the network 30. The exchanged data comprise the IOS data 222, the GUI data 232 and the simulation data 212 represented in FIGS. 2A and 2B. The communication interface 203 supports one of more communication protocols, such as Wi-Fi, Ethernet, etc.

The simulation server 200 may comprise a display 204 (e.g. a regular screen or a tactile screen) for displaying data processed and/or generated by the processing unit 201. The simulation server 200 may also comprise one or more user interface 205 (e.g. a mouse, a keyboard, a trackpad, a touchscreen, etc.) for allowing a user to interact directly with the simulation server 200.

The server IOS functionality 220, the server simulation functionalities 210, and the server GUI functionality 230 are implemented by one or more computer programs. Each computer program comprises instructions for implementing the corresponding function when executed by the processing unit 201. The instructions are comprised in a non-transitory computer program product (e.g. memory 202). The instructions are deliverable via an electronically-readable media, such as a storage media (e.g. a USB key or a CD-ROM) or the network 30 (through the communication interface 203).

Referring more specifically to FIG. 3B, the simulator 300 comprises a processing unit 301, having one or more processors (not represented in FIG. 3B for simplification purposes) capable of executing instructions of computer program(s). Each processor may further have one or several cores. The processing unit 301 implements functionalities of the simulator 300 by executing instructions of the computer program(s). The functionalities implemented by the processing unit 301 include the simulator simulation functionalities 310, the simulator IOS UI 320 and the simulator GUI 330.

The simulator 300 comprises memory 302 for storing instructions of the computer program(s) executed by the processing unit 301, data generated by the execution of the computer program(s), data received via a communication interface 303, etc. The simulator 300 may comprise several types of memories, including volatile memory, non-volatile memory, etc.

The simulator 300 comprises the communication interface 303, for exchanging data with other devices, including the simulation server 200 via the network 30. The exchanged data comprise the IOS data 222, the GUI data 232 and the simulation data 212 represented in FIG. 2A. The communication interface 303 supports one of more communication protocols, such as Wi-Fi, Ethernet, etc.

The simulator comprises one or more actuators 306 for actuating physical component(s) of the simulator 300 (for example. actuating hydraulic cylinders for moving a simulated control cabin of an aircraft) under the control of the simulator simulation functionalities 310 executed by the processing unit 301.

The simulator 300 comprises one or more displays 304 (e.g. a regular screen or a tactile screen) for displaying data processed and/or generated by the processing unit 301. The simulator 300 also comprises one or more user interface 305 (e.g. traditional computer user interfaces as well as dedicated simulation user interfaces) for allowing users to interact with the simulator 300.

In a particular embodiment, the simulator IOS UI 320 includes a display function 321 and an interaction function 322. The display function 321 processes the IOS control and monitoring data 222 and the simulation data 212 of FIG. 2A, received from the simulation server 200 via the communication interface 303, and displays the processed IOS control and monitoring data 222 and simulation data 212 on the display 304.

The simulator IOS UI interaction function 322 generates the IOS interaction data 222 of FIG. 2A based on the interactions of the user 10 (via the user interface(s) 305) with the processed IOS control and monitoring data 222 displayed on the display 304. The IOS interaction data 222 are transmitted to the server IOS functionality 220 of the simulation server 200 through the communication interface 303.

The simulator GUI 330 may also include a display function and an interaction function, not represented in FIG. 3B for simplification purposes. The display function processes the GUI graphical data 232 and the server simulation data 212 of FIG. 2A, received from the simulation server 200 via the communication interface 303, and displays the processed GUI graphical data 232 and server simulation data 212 on the display 304.

The interaction function of the simulator GUI 330 generates the GUI interaction data 232 of FIG. 2A based on the interactions of the user 20 (via the user interface(s) 305) with the processed GUI graphical data 232 displayed on the display 304. The GUI interaction data 232 are transmitted to the server GUI functionality 230 of the simulation server 200 through the communication interface 303.

In another particular embodiment, the simulator simulation functionalities 310 include a display function 311 and an actuation function 312. The display function 311 processes simulation data 212 of FIG. 2A received from the simulation server 200 via the communication interface 303, and displays the processed simulation data on the display 304. The display function 311 can be used for displaying the simulation data 212 of FIG. 2A which cannot be displayed via the simulator IOS UI 320 or the simulator GUI 330.

The actuation function 312 processes other simulation data 212 of FIG. 2A which include actuation data, received from the simulation server 200 via the communication interface 303. The actuation function 312 processes the received actuation data and actuates a corresponding actuator 306. The actuation function 312 also generates feedback actuation data representative of a state of the actuated corresponding actuator 306. The feedback actuation data are transmitted to the simulation server 200 through the communication interface 303. More specifically, simulation data 212 of FIG. 2A comprising the feedback actuation data are transmitted to the server simulation functionalities 210 represented in FIG. 3A.

The simulator simulation functionalities 310, the simulator IOS UI 320, and the simulator GUI 320 are implemented by one or more computer programs. Each computer program comprises instruction for implementing the corresponding function when executed by the processing unit 301. The instructions are comprised in a non-transitory computer program product (e.g. memory 302). The instructions are deliverable via an electronically-readable media, such as a storage media (e.g. a USB key or a CD-ROM) or the network 30 (through the communication interface 303).

Referring more specifically to FIG. 3C, the portable computing device 400 comprises a processing unit 401, having one or more processors (not represented in FIG. 3C for simplification purposes) capable of executing instructions of computer program(s). Each processor may further have one or several cores. The processing unit 401 implements functionalities of the portable computing device 400 by executing instructions of the computer program(s). The functionalities implemented by the processing unit 401 include the portable computing device IOS UI 420.

The portable computing device 400 comprises memory 402 for storing instructions of the computer program(s) executed by the processing unit 401, data generated by the execution of the computer program(s), data received via a communication interface 403, etc. The portable computing device 400 may comprise several types of memories, including volatile memory, non-volatile memory, etc.

The portable computing device 400 comprises the communication interface 403, for exchanging data with other devices, including the simulation server 200 via the network 30. The exchanged data comprise the IOS data 222 and the simulation data 212 represented in FIG. 2B. The communication interface 403 supports one of more communication protocols, such as Wi-Fi, Ethernet, etc.

The portable computing device 400 comprises a display 404 (e.g. a regular screen or a tactile screen) for displaying data processed and/or generated by the processing unit 401. The portable computing device 400 also comprises at least one user interface 405 (e.g. a mouse, a keyboard, a trackpad, a touchscreen, etc.) for allowing a user (not represented in FIG. 3C) to interact with the portable computing device 400.

In a particular embodiment, the portable computing device IOS UI 420 includes a display function 421 and an interaction function 422. The display function 421 and interaction function 422 operate in a similar manner as the display function 321 and interaction function 322 represented in FIG. 3B.

The portable computing device IOS UI 420 is implemented by one or more computer programs. Each computer program comprises instruction for implementing the corresponding function when executed by the processing unit 401. The instructions are comprised in a non-transitory computer program product (e.g. memory 402). The instructions are deliverable via an electronically-readable media, such as a storage media (e.g. a USB key or a CD-ROM) or the network 30 (through the communication interface 403).

In an alternative embodiment not represented in the Figures for simplification purposes, the portable computing device 400 of FIG. 3C may correspond to the portable computing device 400' represented in FIG. 2B. The functionalities implemented by the processing unit 401 include the portable computing device GUI 430 of FIG. 2B in place of the portable computing device IOS UI 420. The data exchanged with the simulation server 200 comprise the GUI data 232 and the simulation data 212 of FIG. 2B.

In still another alternative embodiment not represented in the Figures for simplification purposes, the portable computing device 400 of FIG. 3C may be adapted for implementing both the portable computing device IOS UI 420 and the portable computing device GUI 430 illustrated in FIG. 2B. If user 10 is using the portable computing device 400, the portable computing device IOS UI 420 is executed by the processing unit 401. If user 20 is using the portable computing device 400, the portable computing device GUI 430 illustrated in FIG. 2B is executed by the processing unit 401.

In a particular aspect, the processing unit 201 of the simulation server 200 further executes a web server function 250, for implementing the exchange of data between the simulation server 200 and the simulator 300 or the portable computing devices 400. One of the users 10 or 20 (for example an instructor or a trainee) initiates a simulation web session between the web server function 250 and a web client implemented by the simulator 300 or portable computing devices 400, as will be detailed later in the description. Once the simulation web session is set up, data can be exchanged between the simulation server 200 and the simulator 300 or portable computing devices 400 via the web server function 250. The simulation data 212, the IOS data 222, and the GUI data 232 represented in FIGS. 2A and 2B are exchanged via the web server function 250.

In another particular aspect, the processing unit 201 of the simulation server 200 further executes at least one rendering function 240. Each instance of rendering function 240 is launched by the web server function 250, after the aforementioned simulation web session has been initiated, as will be detailed later in the description. Each instance of rendering function 240 generates data adapted for rendering on a specific destination device. For example, if the specific destination device is the portable computing device 400, data such as 2D or 3D simulation images may need to be adapted to the particular processing and display capabilities of the portable computing device 400. If the specific destination device is the simulator 300, these data may not need a specific adaptation for rendering on the simulator 300. Thus, data which do not need to be adapted are transmitted directly by the web server function 250, while data which need to be adapted (e.g. 2D or 3D simulation images) are processed by an instance of rendering function 240 for adaptation purposes. The adapted data may be transmitted by the rendering function 240 to a destination device. Alternatively, the adapted data are also transmitted via the web server function 250 to a destination device. For illustration purposes, in the rest of the description, the adapted data will be transmitted by the rendering function 240 to a destination device (e.g. portable computing device 400). Usually, some of the simulation data 212 represented in FIGS. 2A and 2B contain 2D or 3D simulation images such as maps, which need to be adapted by an instance of rendering function 240, in particular for transmission to a portable computing device 400 with limited processing capabilities, display capabilities, etc. However, some of the IOS data 222 and GUI data 232 represented in FIGS. 2A and 2B may also be adapted by an instance of rendering function 240 when needed.

The adaptation of a static 2D or 3D simulation image (or a flow of 2D or 3D simulation images) by an instance of rendering function 240 may consist in one of the following: encoding the simulation image(s) in a particular format (e.g. JPEG, GIF, TIFF, PNG, etc.), applying a particular compression algorithm to the simulation image(s), applying a particular image sampling algorithm to the simulation image(s), and applying a particular algorithm for lowering an image resolution of the simulation image(s).

Since at least some of the communications with the simulation server 200 are performed through the web server function 250, the processing unit 301 of the simulator 300 and the processing unit 401 of the portable computing device 400 respectively execute a web client function 350 and 450. The web client functions 350 and 450 are used for establishing the previously described simulation web session with the web server function 250 of the simulation server 200. The web client functions 350 and 450 are further used for exchanging data (e.g. simulation data 212, IOS data 222 and GUI data 232 represented in FIGS. 2A and 2B) with the web server function 250 of the simulation server 200. For instance, data transmitted by the web server function 250 to the simulator IOS UI 320 are received by the web client function 350, and forwarded to the simulator IOS UI 320. Data to be transmitted by the simulator IOS UI 320 to the simulation server 200 are transmitted to the web client function 350, which forwards them to the web server function 250. The use of a web client for exchanging data is well known in the art, and will not be further detailed in the rest of the description.

With respect to the adapted data transmitted by an instance of rendering function 240 of the simulation server 200, they are not received by a web client (e.g. 450 on the portable computing device 400), but received directly by the destination functionality (e.g. portable computing device IOS UI 420). A proprietary communication protocol using pre-defined or dynamically allocated communication sockets can be used for transmitting the adapted data, as is well known in the art.

For illustration purposes, the operations of the web server function 250 and the rendering functions 240 will now be detailed in the context of an exchange of data between the simulation server 200 and the portable computing device 400. In this context, some of the data transmitted by the simulation server 200 need to be adapted to the capabilities of the portable computing device 400 by one or more instances of rendering function 240, while other data can be transmitted directly via the web server function 250.

The data adapted for rendering on a particular destination device (e.g. portable computing device 400) usually consist in simulation data generated by the simulation functionalities 210 (e.g. 2D or 3D maps), and adapted by a particular instance of rendering function 240. For example, the aforementioned Navigation function of the server simulation functionalities 210 generates simulation data transmitted to a Navigation rendering function 240. The Navigation rendering function 240 adapts the simulation data (e.g. a navigation map) for rendering on the portable computing device 400, and transmits the adapted simulation data to the portable computing device 400. Similarly, the aforementioned Weather function of the server simulation functionalities 210 generates simulation data transmitted to a Weather rendering function 240. The Weather rendering function 240 adapts the simulation data (e.g. a weather map) for rendering on the portable computing device 400, and transmits the adapted simulation data to the portable computing device 400. A plurality of instances of rendering function 240 (e.g. Navigation and Weather rendering functions) can be simultaneously generating and transmitting adapted simulation data to the portable computing device 400. The display function 421 of the portable computing device IOS UI 420 receives and displays the simulation data which have been adapted and transmitted by the Navigation and Weather rendering functions 240.

The web server function 250 directly transmits data to the portable computing device 400, which do not need to be processed by one of the instances of rendering function 240. Such data usually include the IOS control and monitoring data 222 (e.g. a control web page) generated by the server IOS functionality 220, which are transmitted to the web server function 250, and further transmitted to the portable computing device 400. Such data may also include complementary simulation data generated by one of the server simulation functionalities 210. For instance, the Navigation function of the server simulation functionalities 210 generates complementary simulation data (e.g. parameters of the simulation such as wind speed, events of the simulation such as aircraft speed too high, etc.), which are transmitted to the web server function 250, and further transmitted to the portable computing device 400. The parameters and/or events can be displayed on the display 404 of the portable computing device 400 in the form of icons, text fields, etc. For instance, the parameters and/or events constitute additional simulation information displayed in complement of a Navigation map displayed on the display 404 of the portable computing device 400. The Navigation map has been generated by the Navigation rendering function 240 based on simulation data generated by the Navigation function of the server simulation functionalities 210, and transmitted to the portable computing device 400.

For example, the IOS function IOS_1 of the server IOS functionality 220 transmits IOS control and monitoring data 222 (e.g. a Navigation control web page) to the portable computing device 400 for controlling the execution of the Navigation function of the server simulation functionalities 210. The IOS control and monitoring data 222 are transmitted by the IOS function IOS_1 to the web server function 250, and further transmitted to the portable computing device 400 for display. The IOS control and monitoring data 222 are displayed by the display function 421 of the portable computing device IOS UI 420 on the display 404. User 10 interacts with the displayed IOS control and monitoring data 222 (e.g. the Navigation control web page) and the interaction function 422 of the portable computing device IOS UI 420 generates IOS interaction data 222. User 10 interacts via the user interface 405 (e.g. a keyboard, a mouse, a trackpad, a touch screen, etc.) of the portable computing device 400, and the IOS interaction data 222 are generated based on this interaction. The IOS interaction data 222 are transmitted by the portable computing device 400 to the web server function 250, and forwarded to the IOS function IOS_1. The IOS function IOS_1 processes the IOS interaction data 222 and controls the execution of the Navigation function of the server simulation functionalities 210 based on the processed IOS interaction data 222.

Simultaneously, the IOS function IOS_2 of the server IOS functionality 220 transmits IOS control and monitoring data 222 (e.g. a Weather control web page) to the portable computing device 400 for controlling the execution of the Weather function of the server simulation functionalities 210. The IOS control and monitoring data 222 are transmitted by the IOS function IOS_2 to the web server function 250, and further transmitted to the portable computing device 400 for display. The IOS control and monitoring data 222 are displayed by the display function 421 of the portable computer device IOS UI 420 on the display 404. User 10 interacts with the displayed control data (e.g. the Weather control web page) and the interaction function 422 of the portable computing device IOS UI 420 generates IOS interaction data 222. The IOS interaction data 222 are transmitted by the portable computing device 400 to the web server function 250, and forwarded to the IOS function IOS_2. The IOS function IOS_2 processes the IOS interaction data 222 and controls the execution of the Weather function of the server simulation functionalities 210 based on the processed IOS interaction data 222.

In a particular embodiment, a visual database (not shown in the Figures) may be used on the simulation server 200. The visual database contains data (e.g. terrain, buildings, 3D models, etc.) that can be streamed and displayed on the portable computing device 400, via one or more instances of rendering function 240. The visual database also contains parameters and/or events that can be overlaid on the displayed data, after direct transmission to the portable computing device 400 via the web server function 250.

Figure 4:
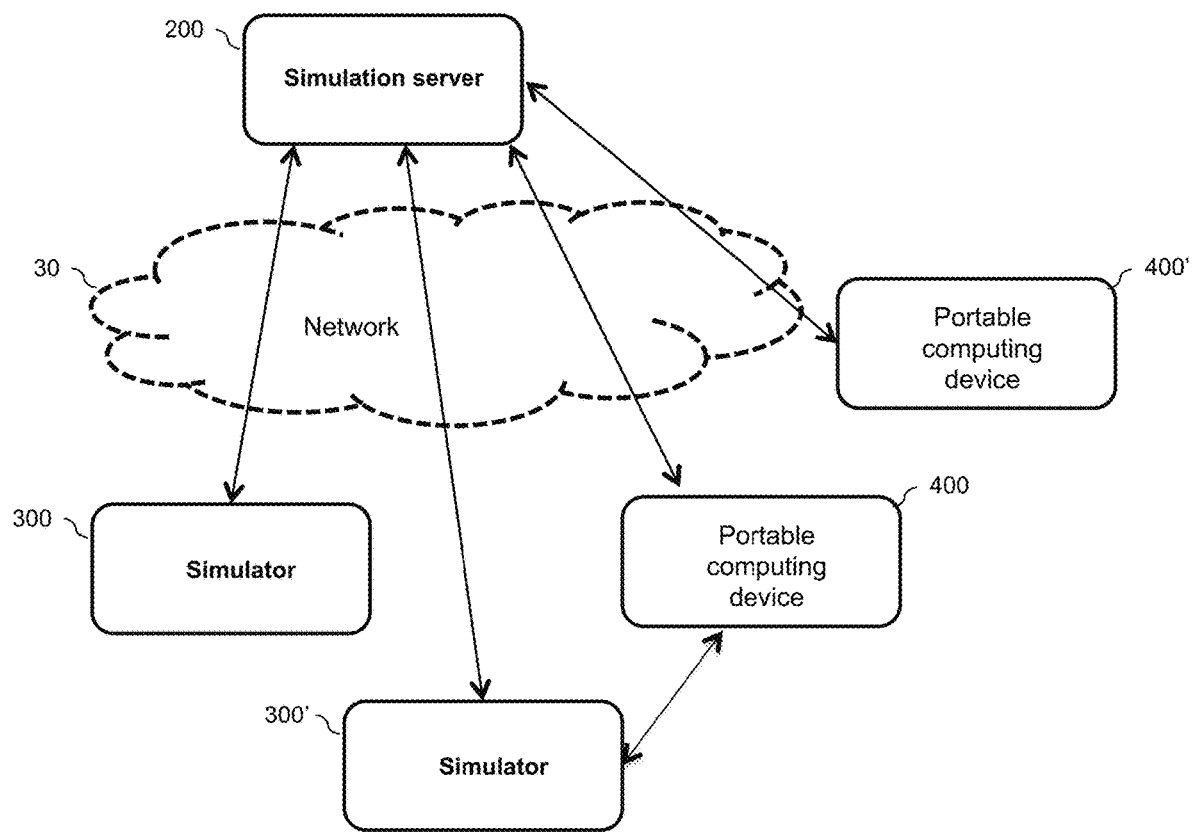
FIG. 4 illustrates a simulation server concurrently interacting with a plurality of simulators and portable computing devices.

Referring now simultaneously to FIGS. 3A and 4, FIG. 4 illustrates a single simulation server 200 supporting a plurality of simulators (e.g. 300 and 300'), and a plurality of computing devices (e.g. 400 and 400'). Although two simulators have been represented in FIG. 4, the simulation server 200 may support any number of simulators, based on its processing and communication capabilities. Similarly, although two portable computing devices have been represented in FIG. 4, the simulation server 200 may support any number of portable computing devices, based on its processing and communication capabilities.

For illustration purposes, the simulation server 200 executes a first simulation and a first user (a trainee in this particular instance) interacts with the first simulation via the simulator 300, while a second user (an instructor in this particular instance) interacts with the first simulation via the portable computing device 400. Simultaneously, the simulation server 200 executes a second simulation and a third user (another trainee) interacts with the second simulation via the simulator 300', while a fourth user (a second instructor) interacts with the second simulation via the portable computing device 400'.

For illustration purposes, the server simulation functionalities 210 of the simulation server 200 execute simultaneously a first instance of Weather function in relation to the first simulation, and a second instance of Weather function in relation to the second simulation. Each instance of Weather function generates simulation data (e.g. a weather map), which are respectively transmitted directly to the simulators 300 and 300', via the web server function 250, without using a rendering function 240. Although two instances of Weather function are mentioned in this example, a larger number of instances can be operating simultaneously on the simulation server 200.

For illustration purposes, the rendering functions 240 execute simultaneously a first instance of Weather rendering function in relation to the first simulation, and a second instance of Weather rendering function in relation to the second simulation. Each instance of Weather function executed by the server simulation functionalities 210 generates simulation data (e.g. the weather map), which are respectively adapted by the instances of Weather rendering function, before transmission to the portable computing devices 400 and 400'. Although two instances of Weather rendering function are mentioned in this example, a larger number of instances can be operating simultaneously on the simulation server 200. The adapted simulation data transmitted to the portable computing devices 400 and 400' may differ, based on specific characteristics of each of the portable computing devices 400 and 400'. For instance, a Weather map with a better resolution may be generated for the portable computing devices 400 than for the portable computing device 400'.

For illustration purposes, the server IOS functionality 220 executes simultaneously a first and a second instance of the IOS function IOS_2 for respectively controlling the first and second instances of Weather function executed by the server simulation functionalities 210. The first instance of IOS function IOS_2 transmits IOS control and monitoring data 222 (e.g. a Weather control web page) to the portable computing device 400 for controlling the execution of the first instance of Weather function. The control data are transmitted by the first instance of IOS function IOS_2 to the web server function 250, and further transmitted to the portable computing device 400 for display. IOS Interaction data 222 are generated and transmitted by the portable computing device 400 to the web server function 250, and forwarded to the first instance of IOS function IOS_2. The first instance of IOS function IOS_2 processes the IOS interaction data 222 and controls the execution of the first instance of Weather function executed by the server simulation functionalities 210, based on the processed IOS interaction data 222.

The second instance of IOS function IOS_2 transmits IOS control and monitoring data 222 (e.g. a Weather control web page) to the portable computing device 400' for controlling the execution of the second instance of Weather function executed by the server simulation functionalities 210. The control data are transmitted by the second instance of IOS function IOS_2 to the web server function 250, and further transmitted to the portable computing device 400' for display. IOS Interaction data 222 are generated and transmitted by the portable computing device 400' to the web server function 250, and forwarded to the second instance of IOS function IOS_2. The second instance of IOS function IOS_2 processes the IOS interaction data 222 and controls the execution of the second instance of Weather function executed by the server simulation functionalities 210, based on the processed IOS interaction data 222. Although two instances of IOS function IOS_2 are mentioned in this example, a larger number of instances can be operating simultaneously on the simulation server 200.

Alternatively, the server simulation functionalities 210 may execute simultaneously an instance of Weather function in relation to the first simulation, and an instance of Navigation function in relation to the second simulation. Each instance of Weather and Navigation function executed by the server simulation functionalities 210 generates simulation data (e.g. a weather map and a navigation map), which are respectively transmitted directly to the simulators 300 and 300', via the web server function 250. The rendering functions 240 execute simultaneously an instance of Weather rendering function in relation to the first simulation, and an instance of Navigation rendering function in relation to the second simulation. Each instance of Weather and Navigation function executed by the server simulation functionalities 210 generates simulation data (e.g. the weather map and the navigation map), which are respectively adapted by the instances of Weather and Navigation rendering function, before transmission to the portable computing devices 400 and 400'.

In this case, the server IOS functionality 220 executes simultaneously an instance of IOS function IOS_1 and an instance of IOS function IOS_2, for respectively controlling the instances of Navigation and Weather function executed by the server simulation functionalities 210. The instances of IOS function IOS_1 and IOS function IOS_2 operate as previously described with respect to the portable computing devices 400 and 400'.

In a similar manner, the server GUI functionality 230 executes simultaneously a first instance of the server GUI functionality 230 in relation to the first simulation, and a second instance of the server GUI functionality 230 in relation to the second simulation. Each instance of the server GUI functionality 230 generates GUI graphical data 232, which are respectively transmitted to the simulators 300 and 300', via the web server function 250. Each instance of server GUI functionality 230 also receives, via the web server function 250, GUI interaction data 232 which are respectively transmitted by the simulators 300 and 300'. The simulator GUI 330 displays the GUI graphical data 232 received from the simulation server 200 on the simulators 300 and 300', and generates the GUI interaction data 232 based on the interactions of the users 20 with the displayed GUI graphical data 232. Each instance of the server GUI functionality 230 on the simulation server 200 processes the GUI interaction data 232 transmitted by the simulators 300 and 300', and respectively controls the execution of the first and second instance of the simulation, based on the processed GUI interaction data 232. Simulation data generated by the server simulation functionalities 210 are also transmitted directly by the web server function 250 (without adaptation by a rendering function 240) to the simulators 300 and 300', for display by the simulator GUI 330.

In an alternative embodiment, the web server function 250 is executed by a dedicated processing unit of the simulation server 200 (not represented in the Figures) different from the processing unit 201.

In another alternative embodiment, several instances of the web server function 250 are executed by the processing unit 201. For example, an instance is dedicated to the server IOS functionality 220, an instance is dedicated to the server simulation functionalities 210 and an instance is dedicated to the server GUI functionality 230. As mentioned previously, at least some of the instances may be executed by a dedicated processing unit different from the processing unit 201.

In still another alternative embodiment, the web server function 250 is not implemented on the simulation server 200, but on a standalone server not represented in the Figures.

Figure 6A:
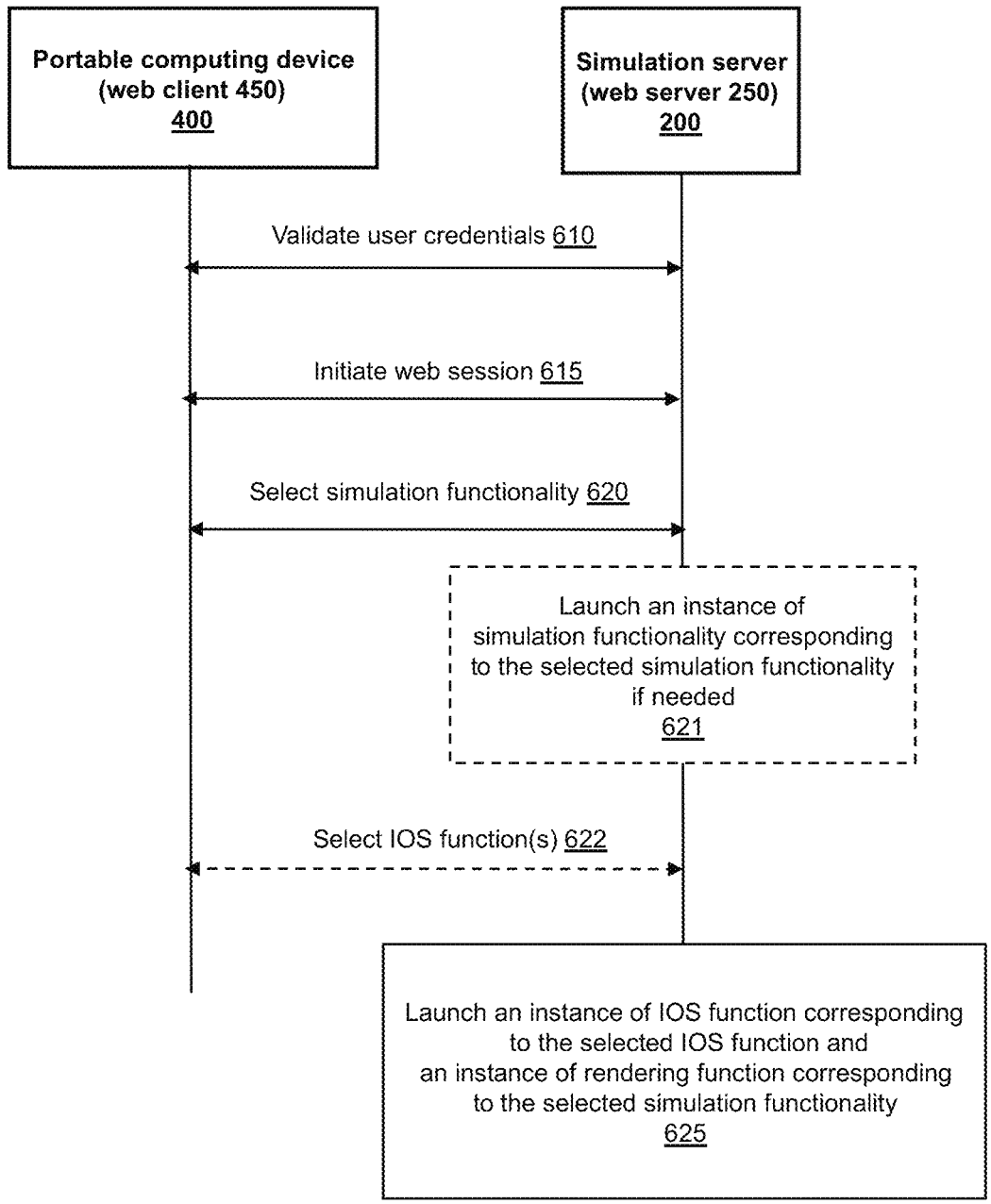
FIGS. 6A, 6B and 6C represent an exemplary flow diagram illustrating interactions between components of the simulation server of FIG. 3A and the portable computing device of FIG. 3C.
Figure 6B:
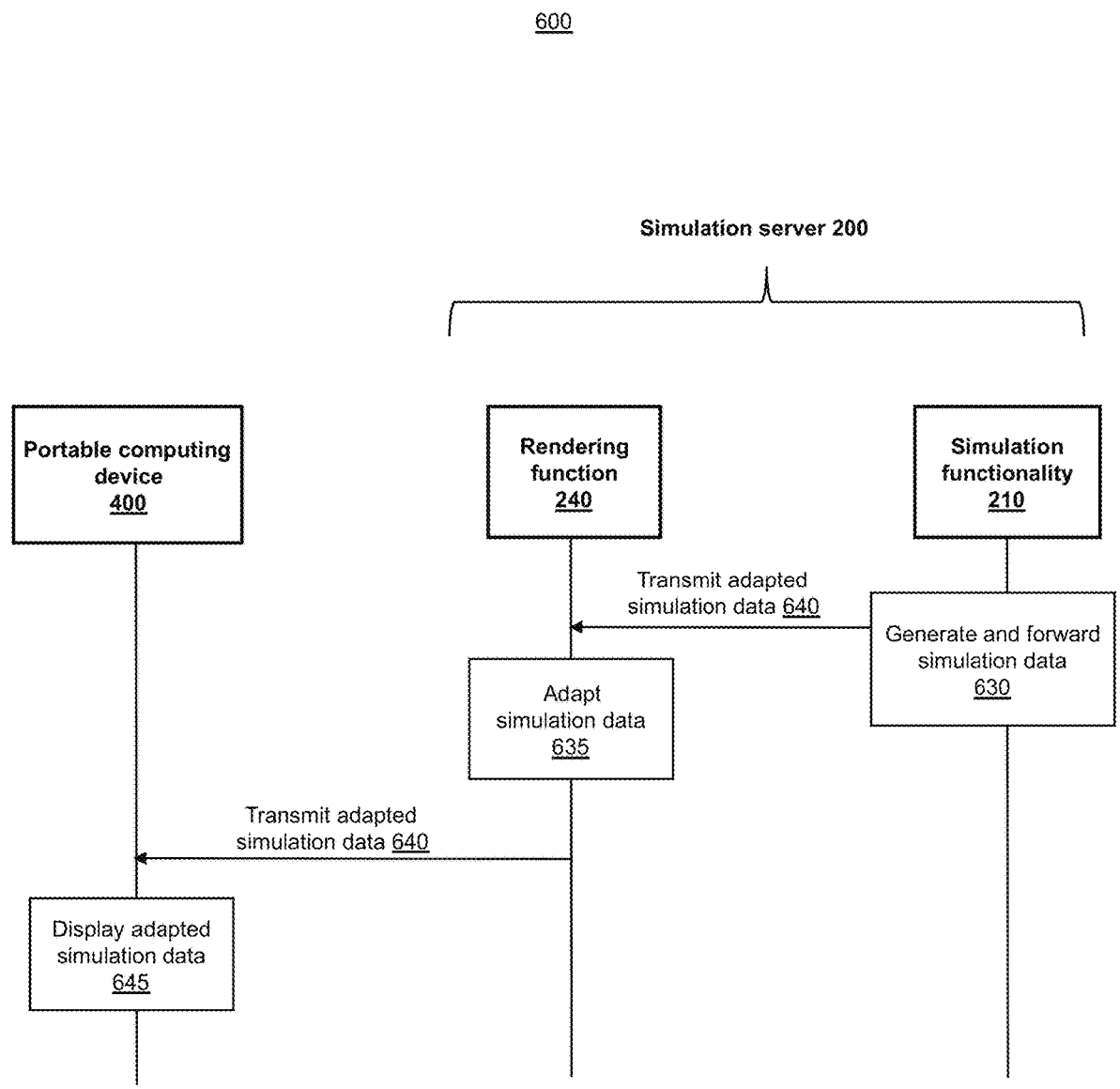
Figure 6C:
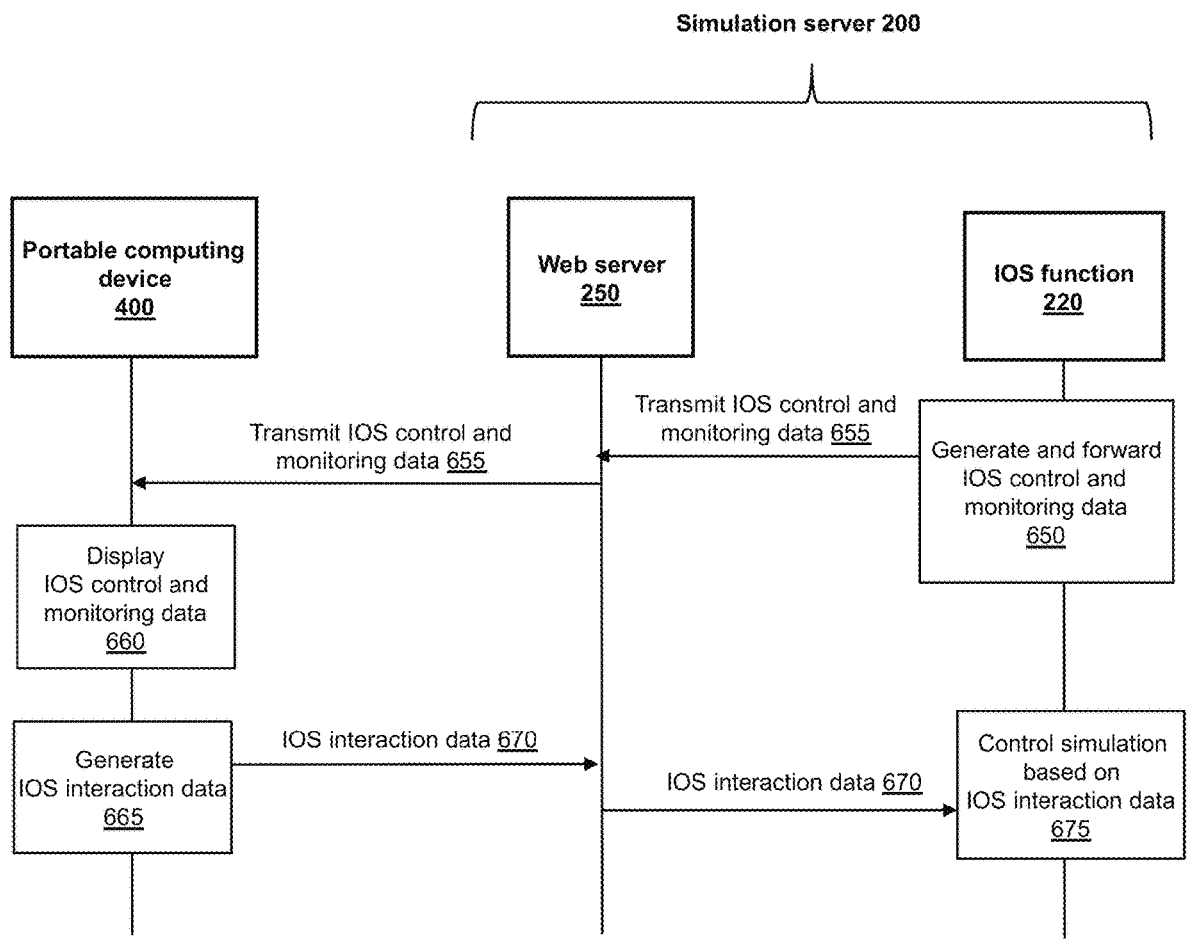

Reference is now made concurrently to FIGS. 3A, 3B, 3C, 6A, 6B and 6C, where FIGS. 6A, 6B and 6C represent an exemplary flow diagram 600 illustrating interactions between the portable computing device 400 and components of the simulation server 200. More precisely, this exemplary flow diagram 600 illustrates interactions of the portable computing device IOS UI 420 with the simulation server 200.

At step 610, the user of the portable computing device 400 performs an authentication by entering its credentials, and the portable computing device web client function 450 transmits the credentials to the web server function 250. The web server function 250 verifies if the user is authorized to connect to the simulation portal based on the user credentials, and grants/denies access to the simulation portal based on the result of the verification of the user credentials. This step is optional, but is usually implemented to avoid that any user is granted access to the simulation portal without restrictions. An administrator of the simulation portal may be granted access to management functionalities of the portal, while standard users generally only have access to simulation functionalities of the portal.

At step 615, the portable computing device web client function 450 initiates a simulation web session with the web server function 250. For example, the user of the portable computing device 400 enters a Uniform Resource Locator (URL) corresponding to a simulation portal hosted by the web server function 250, and the portable computer device web client function 450 requests a connection to the simulation server 200, hereinafter referred as the simulation portal. In return, the web server function 250 returns a home page of the simulation portal to be displayed by the portable computing device web client function 450.

At step 620, the web server function 250 transmits a list of candidate server simulation functionalities 210 (e.g. Weather function, Navigation function, etc.) to the portable computing device web client function 450. The list may be determined based on a particular profile of the user, and may comprise only a subset (e.g. Weather function only) of all available server simulation functionalities 210 supported by the web server function 250. The subset corresponds to server simulation functionalities 210 (e.g. Weather function only) that the user of the portable computing device 400 is authorized to use based on its profile. For each user, the web server function 250 stores a profile of the user for determining the corresponding authorized server simulation functionalities 210. The profile of each user can be generated by an administrator of the web server function 250. For example, in the case of an aircraft simulation, the user may only be authorized to use server simulation functionalities 210 corresponding to one or more particular type(s) of aircraft, to one or more particular system(s) or sub-system(s) of an aircraft, to military or civilian aircrafts only, etc. The portable computing device web client function 450 displays the list of candidate server simulation functionalities 210 (e.g. Weather function and Navigation function) for allowing the user to select one among the list of candidates. The selection of a particular server simulation functionality (e.g. Weather function) in the list of candidate server simulation functionalities 210 by the user is transmitted to the web server function 250 function by the portable computing device web client function 450. Alternatively, a plurality of candidate server simulation functionalities 210 can be selected simultaneously.

At step 621, the web server function 250 determines if an instance of the selected server simulation functionality 210 (e.g. Weather function) is already running, and if it is not the case, launches such an instance. Since the simulation server 200 can support a plurality of simulation sessions in parallel, a server simulation functionality 210 (e.g. Weather function)

may have several instances running in parallel for different independent simulation sessions. Thus, before executing step 620, the user may need to join an existing simulation session or create a new simulation session. The creation of/joining to a simulation session is performed through interactions between the portable computing device web client function 450 and the web server function 250. Each independent simulation session is allocated a unique identifier and information describing the characteristics of the simulation session, so that any portable computing device 400 or simulator 300 can join the proper ongoing simulation session based on its characteristics (e.g. type of aircraft simulated, simulator 300 used for the simulation, etc.).

The selected server simulation functionality 210 (e.g. Weather function) may automatically provide access to corresponding IOS function(s) of the server IOS functionality 220 (e.g. IOS function IOS_2). Alternatively, an interactive selection step 622 similar to selection step 620 is performed. At step 622, the web server function 250 transmits a list of candidate IOS function(s) of the server IOS functionality 220 (e.g. IOS function IOS_1, IOS function IOS_2, etc.) to the portable computing device web client function 450. The list may be determined based on a particular profile of the user, and may comprise only a subset (e.g. IOS function IOS_2 only) of all available server IOS functions supported by the web server function 250. The subset corresponds to server IOS functions 220 (e.g. IOS function IOS_2 only) that the user of the portable computing device 400 is authorized to use based on its profile. For each potential user, the web server function 250 stores a profile of the user for determining the corresponding authorized server IOS functions 220. The portable computing device web client function 450 displays the list of candidate server IOS functions 220 (e.g. IOS function IOS_1 and IOS function IOS_2) for allowing the user to select one among the list of candidates. The selection of server IOS functions 220 (e.g. IOS function IOS_2) in the list of candidate server IOS functions by the user is transmitted to the web server function 250 by the portable computing device web client function 450. Alternatively, a plurality of candidate server IOS functions 220 can be selected simultaneously.

At step 625, the web server function 250 launches an instance of server IOS function 220 corresponding to the IOS function (e.g. IOS_2) selected at step 622. The web server function 250 also launches an instance of server rendering function 240 (e.g. Weather rendering function) corresponding to the server simulation functionality 210 (e.g. Weather function) selected at step 620. As mentioned previously, several instances of the same server IOS function 210 or server rendering function 240 can be executed in parallel by the simulation server 200, for supporting a plurality of simulation sessions running in parallel, and also for supporting a plurality of portable computing devices 400 participating in parallel to the same or similar simulation sessions. Furthermore, a single portable computing device 400 may be interacting with a plurality of server IOS functions 210 and/or a plurality of server rendering functions 240 in parallel.

The web server function 250 establishes a first communication channel for exchanging data between the portable computing device 400 and the instance of server IOS function 220 (e.g. IOS function IOS_2) launched at step 625; and optionally between the portable computing device 400 and the instance of server simulation functionality 210 (e.g. Weather function) launched at step 621 (to directly transmit simulation data which do not need to be adapted by a rendering function). The data are exchanged between the simulation server 200 and the portable computing device 400 through the web server function 250 and the portable computing device web client 450. All the data exchanged through this first communication channel do not need to be adapted for rendering on the portable computing device 400 via a server rendering function 240.

The web server function 250 establishes a second communication channel between the instance of server rendering function 240 (e.g. Weather rendering function) launched at step 625 and the portable computing device 400, for transmitting simulation data adapted for rendering on the portable computing device 400. Establishing this second communication channel is well known in the art, and may comprise determining a connection identification, selecting communication protocol(s), allocating communication sockets, etc.

The web server function 250 may create and manage a dynamic communication profile for each portable computing device 400, comprising characteristics of the created first and second communication channels. The management of the dynamic communication profile includes creation/update/deletion of the first and second communication channels.

Furthermore, the web server function 250 provides the launched instance of server rendering function 240 with characteristics of the portable computing device 400. The characteristics include for example processing power, memory size, display resolution, data throughput of a communication interface, available user interfaces, etc. These characteristics are used by the launched instance of server rendering function 240 for performing the adaptation of the simulation data transmitted to the portable computing device 400. For each authorized user of the simulation portal, the web server function 250 may store a static profile (with the aforementioned characteristics) of the portable computing device 400 used by the user. Alternatively, the web server function 250 automatically generates a dynamic profile (with the aforementioned characteristics) of the portable computing device 400 used by the user at step 610, by dynamically retrieving the characteristics of the device 400 currently used by the user (this procedure is well known in the art of web browsing).

FIG. 6B more specifically represents the transmission of adapted simulation data by the instance of server rendering function 240 to the portable computing device 400.

At step 630, the instance of server simulation functionality 210 (e.g. Weather function) generates simulation data and forwards the simulation data to the corresponding instance of server rendering function 240 (e.g. Weather rendering function).

At step 635, the instance of server rendering function 240 processes the simulation data, and generates simulation data adapted (based on the aforementioned characteristics of the portable computing device 400) for rendering on the portable computing device 400.

At step 640, the adapted simulation data are transmitted directly by the instance of server rendering function 240 to the portable computing device 400 (without using the web server function 250).

At step 645, the display function 421 of the portable computing device IOS UI 420 processes the adapted simulation data received from the instance of server rendering function 240, and displays the processed simulation data on the display 404 of the portable computing device 400. Since the simulation data have been adapted to the device 400 at step 635, the processing is very limited and may even not be needed before displaying the simulation data.

Although a single sequence of steps 630, 635, 640 and 645 is represented in FIG. 6B for simplification purposes, a plurality of sequences may occur. For each sequence, simulation data adapted for rendering on the portable computing device 400 are generated at steps 630 and 635, transmitted at step 640 and displayed at step 645.

FIG. 6C more specifically represents the exchange of data not adapted by a server rendering function 240 between the web server function 250 and the portable computing device 400.

At step 650, the instance of server IOS function 220 (e.g. IOS_2) generates IOS control and monitoring data 222 (not adapted by a rendering function), and forwards the IOS control and monitoring data 222 to the web server function 250.

At step 655, the IOS control and monitoring data 222 are transmitted by the web server function 250 to the portable computing device 400 (without applying any rendering function).

At step 660, the display function 421 of the portable computing device IOS UI 420 displays the received IOS control and monitoring data 222 on the display 404 of the portable computing device 400.

At step 665, the interaction function 422 of the portable computing device IOS UI 420 generates IOS interaction data 222 based on interactions of the user of the portable computing device 400 (e.g. with the IOS control and monitoring data 222 displayed at step 660).

At step 670, the IOS interaction data 222 are transmitted by the portable computing device 400 to the web server function 250. The web server function 250 simply forwards the IOS interaction data 222 to the instance of server IOS function 220 (e.g. IOS_2).

The web server function 250 may implement a filtering function (not represented in the Figures), for identifying and adequately handling the data received from the portable computing device(s) 400. The filtering function identifies IOS interaction data 222 received at step 670, which shall be forwarded to the proper instance of server IOS function 220 (e.g. IOS_2). The filtering function also identifies administrative and management data received at steps 610, 615, 620 and 622 of FIG. 6A, which shall be processed directly by the web server function 250.

At step 675, the instance of server IOS function 220 (e.g. IOS_2) processes the IOS interaction data 222 to control the execution of the simulation executed by the simulation server 200 based on the IOS interaction data 222.

Although a single sequence of steps 650, 655 and 660 is represented in FIG. 6C for simplification purposes, a plurality of sequences may occur. Similarly, a plurality of sequences of steps 665, 670 and 675 may occur. A plurality of sequences of steps 650, 655 and 660 may occur before a single sequence of steps 665, 670 and 675 occurs. Similarly, a plurality of sequences of steps 665, 670 and 675 may occur before a single sequence of steps 650, 655 and 660 occurs. However, a sequence of steps 665, 670 and 675 is generally followed by a sequence of steps 650, 655 and 660 (and/or steps 630, 635, 640 and 645 of FIG. 6B); since the processing of the IOS interaction data 222 impacts the execution of the simulation executed by the simulation server 200, which in turn leads to the generation of new adapted simulation data 212/IOS control and monitoring data 222 which are transmitted to the portable computing device 400.

Although not represented in FIG. 6C for simplification purposes, steps 650, 655 and 660 may also consist in the generation by the instance of server simulation functionality 210 represented in FIG. 6B of simulation data which do not need to be adapted by a rendering function, the transmission of these simulation data to the portable computing device 400 directly by the web server function 250, and the display of these simulation data on the portable computing device 400

Furthermore, the transmission of simulation data adapted by the instance of server rendering function 240 as illustrated in FIG. 6B, and the transmission of IOS control and monitoring data 222/simulation data 212 by the web server function 250 (without adaptation by a rendering function) as illustrated in FIG. 6C, occur simultaneously and independently.

As is well known in the art, the communications between the web server function 250 and the portable computing device web client 450 use the Hypertext Transfer Protocol (HTTP) and/or Hypertext Transfer Protocol Secure (HTTPS). Optionally, the Real-time Transport Protocol (RTP) may also be used for some of the data exchanged between the web server function 250 and portable computing device(s) 400. A single step represented in FIGS. 6A and 6C (e.g. 610, 615, 620, 622, 655 and 670) may include a plurality of HTTP/HTTPS/RTP messages exchanged between the web server function 250 and portable computing device(s) 400.

Similarly, the communications between the instances of server rendering function 240 and portable computing device(s) 400 may also use the HTTP and/or HTTPS and/or RTP protocols. A single step represented in FIG. 6B (e.g. 640) may include a plurality of HTTP/HTTPS/RTP messages exchanged between the instances of server rendering function 240 and portable computing device(s) 200. In this case, each instance of server rendering function 240 implements an autonomous HTTP based server allowing communications with the portable computing device(s) 400 via web sockets. The establishment of the communication channel between the instances of server rendering function 240 and portable computing device(s) 400 is performed under the direction of the web server function 250 at step 625. However, this communication channel is not limited to the use of the HTTP and/or HTTPS and/or RTP protocols, but may use other non-web-based communication protocols (e.g. a proprietary communication protocol).

The flow diagram 600 is for illustration purposes only. A similar flow diagram may be adapted to illustrate interactions of the portable computing device GUI 430 represented in FIG. 2B, with the simulation server 200. Additionally, similar flow diagrams may be respectively adapted to illustrate interactions of the simulator IOS UI 320, simulator GUI 330 and simulator simulation functionalities 310 executed on the simulator 300 represented in FIG. 2A, with the simulation server 200.

Figure 5:
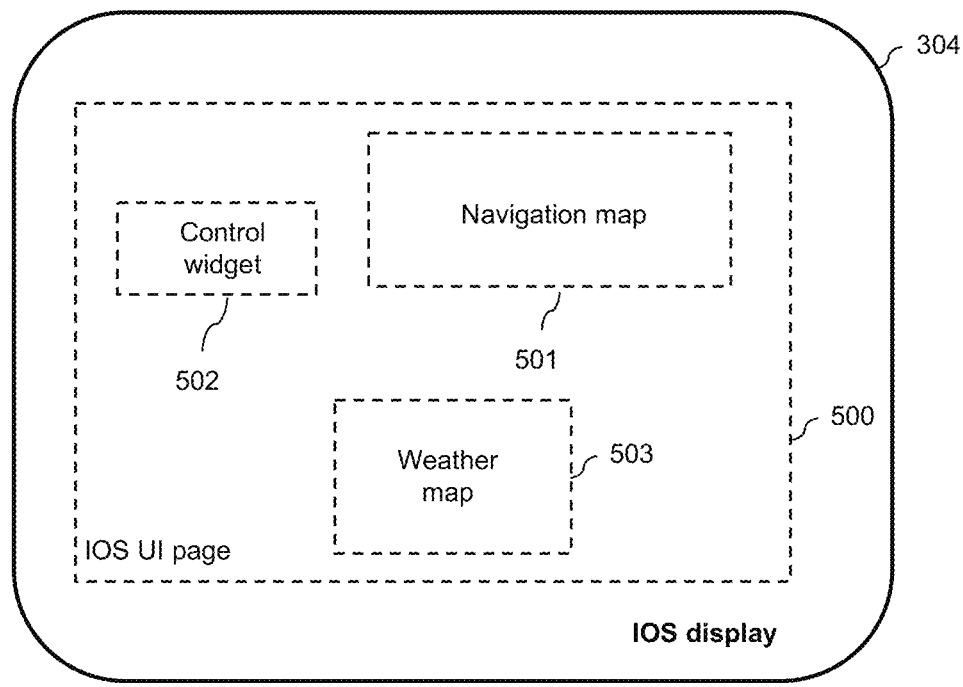
FIG. 5 illustrates respective displays of the simulator and portable computing device of FIGS. 3B and 3C.
Figure 5:
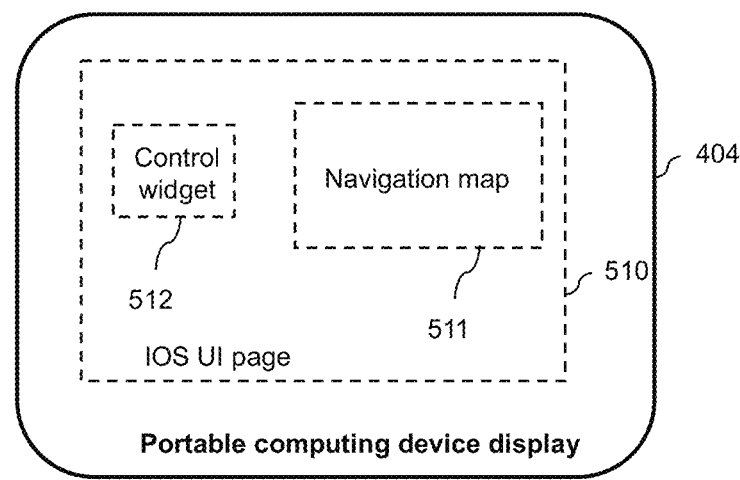

Reference is now made concurrently to FIGS. 3A, 3B, 3C and 5. FIG. 5 represents an IOS UI page 500 displayed on the display 304 of the simulator 300. The IOS UI page 500 is displayed by the display function 321 of the simulator IOS UI 320. The IOS UI page 500 provides a user interface with sub-groups of instances. The IOS UI page 500 generally includes graphical control elements (e.g. menus and sub-menus, list boxes, etc.) for controlling simulation parameters, and graphical display elements (e.g. images, text fields, icons, embedded videos, etc.) for displaying simulation data generated by the server simulation functionalities 210.

The IOS UI page 500 represented in FIG. 5 comprises a first image 501 (Navigation map), a graphical control element 502 (control widget), and a second image 503 (Weather map). The Navigation map is generated by the Navigation function of the server simulation functionalities 210, and directly transmitted (without adaptation by the server rendering function 240) to the simulator IOS UI 320 via the web server function 250, for display on the simulator display 304 by the simulator display function 321. The Navigation map is updated based on the execution of the Navigation function of the server simulation functionalities 210. The Weather map 503 is generated by the Weather function of the server simulation functionalities 210, and directly transmitted (without adaptation by the server rendering function 240) to the simulator IOS UI 320 via the web server function 250, for display on the simulator display 304 by the simulator display function 321. The Weather map is updated based on the execution of the Weather function of the server simulation functionalities 210.

The web server function 250 receives IOS control and monitoring data 222 corresponding to the control widget 502 (for example for allowing control of the Navigation map 501 and Weather map 503) from the server IOS functionality 220. The IOS control and monitoring data 222 are transmitted to the simulator 300 by the web server function 250, and the control widget 502 is displayed on the simulator display 304 by the simulator display function 321 of the simulator IOS UI 321 based on the received IOS control and monitoring data 222. The control widget 502 is used by a user for modifying parameters related for example to the Navigation map 501 and the Weather map 503, when the user interacts with the simulator 300 via the interaction function 322 of the simulator IOS UI 320. IOS Interaction data 222 comprising the modified parameters are transmitted by the interaction function 322 of the simulator IOS UI 320 to the server IOS functionality 220, for controlling for example the execution of the Navigation and Weather functions of the server simulation functionalities 210.

FIG. 5 also represents an IOS UI page 510 displayed on the display 404 of the portable computing device 400. The IOS UI page 510 is displayed by the portable computing device display function 421 of the portable computing device IOS UI 420. For example purposes, the IOS UI page 510 comprises an image 511 (Navigation map) corresponding to the Navigation map 501 of the IOS UI page 500, and a graphical control element 512 (control widget) corresponding to the control widget 502 of the IOS UI page 500.

For illustration purposes, the user of the portable computing device 400 has decided not to use the Weather function of the server simulation functionalities 210, and consequently an image corresponding to the Weather map 503 of the IOS UI page 500 is not displayed on the display 404 of the portable computing device 400. In an alternative use case not represented in FIG. 5, if the user of the portable computing device 400 had decided to use the Weather function of the server simulation functionalities 210, an image corresponding to the Weather map 503 of the IOS UI page 500 would be displayed on the portable computing device display 404.

On the simulation server 200, an instance of Navigation rendering function 240 receives simulation data corresponding to the Navigation map 511 from the Navigation function of the server simulation functionalities 210. The instance of Navigation rendering function 240 processes the simulation data to generate the Navigation map 511 adapted for rendering on the portable computing device 400. For example, the size and resolution of the Navigation map 511 is adapted to characteristics (e.g. screen resolution, etc.) of the portable computing device 400. The Navigation map 511 is transmitted to the portable computing device 400 by the instance of server rendering function 240, and displayed on the portable computing device display 404 by the portable computer device IOS UI 421.

The web server function 250 at the simulation server 200 receives IOS control and monitoring data 222 corresponding to the control widget 512 (for example for allowing control of the Navigation map 511) from the server IOS functionality 220. The IOS control and monitoring data 222 are transmitted to the portable computing device 400 by the web server function 250, and the control widget 512 is displayed on the portable computing device display 404 by the portable computing device IOS UI 421 based on the received IOS control and monitoring data 222.

When the user 10 interacts with the IOS UI page 510 via a user interface 405 of the portable computing device 400, corresponding IOS interaction data 222 are generated by the interaction function 422 of the portable computing device IOS UI 420, and transmitted by the interaction function 422 to the web server function 250 of the simulation server 200. The web server function 250 forwards the IOS interaction data 222 to the server IOS functionality 220.

For example, the control widget 512 is a menu comprising three items. When the user positions a pointer (corresponding to a mouse) on one of the items and left clicks, the transmitted IOS interaction data 222 comprise the selected item.

Alternatively or complementarity, the user 10 may interact directly with an area of the IOS UI page 510 without using the control widget 512. For example, the user 10 may position a pointer (corresponding to a mouse) on the Navigation map 511, and left click or right click on the Navigation map 511. The transmitted IOS interaction data 222 comprise an indication that the user 10 interacted with the Navigation map 511, and more specifically via a right-click or a left-click. The IOS interaction data 222 are interpreted by the server IOS functionality 220 at the simulation server 200 as follows: a left-click is a zoom-in request and a right-click is a zoom-out request. The server IOS functionality 220 reconfigures the Navigation function of the server simulation functionalities 210 accordingly. In case of a zoom-in, the Navigation function of the server simulation functionalities 210 generates more detailed simulation data, which are processed by the instance of Navigation server rendering function 240 for generating a zoomed-in Navigation map 511 for rendering on the portable computing device 400. In case of a zoom-out, the Navigation function of the server simulation functionalities 210 generates less detailed simulation data, which are processed by the instance of Navigation server rendering function 240 for generating a zoomed-out Navigation map 511 for rendering on the portable computing device 400.

More generally, the IOS interaction data 222 are used by the server IOS functionality 220 for controlling the corresponding server simulation functionality 210 (e.g. Navigation function). Controlling the corresponding server simulation functionality 210 includes controlling the simulation data generated by the server simulation functionality 210 (e.g. Navigation function), which are further adapted by the corresponding instance of server rendering function 240 (e.g. instance of Navigation server rendering function 240) for rendering (e.g. Navigation map 511) on the portable computing device display 404.

The web server function 250 may pre-process the received IOS interaction data 222 to determine if they correspond to a legitimate interaction with the IOS UI page 510 displayed on the portable computing device 400. The web server function 250 simply discards transmitted IOS interaction data 222 which do not correspond to a legitimate interaction with the IOS UI page 500, and transmits legitimate interactions to the server IOS functionality 220. The web server function 250 may further discriminate the IOS interaction data 222 generated with the IOS UI page 510, from other types of data (e.g. administration and configuration of the simulation server 200), which are processed directly by the web server function 250.

Lesson Plan and Event Editor

The execution of a simulation by the simulation server 200 is generally performed while following a lesson plan.

Figure 7:
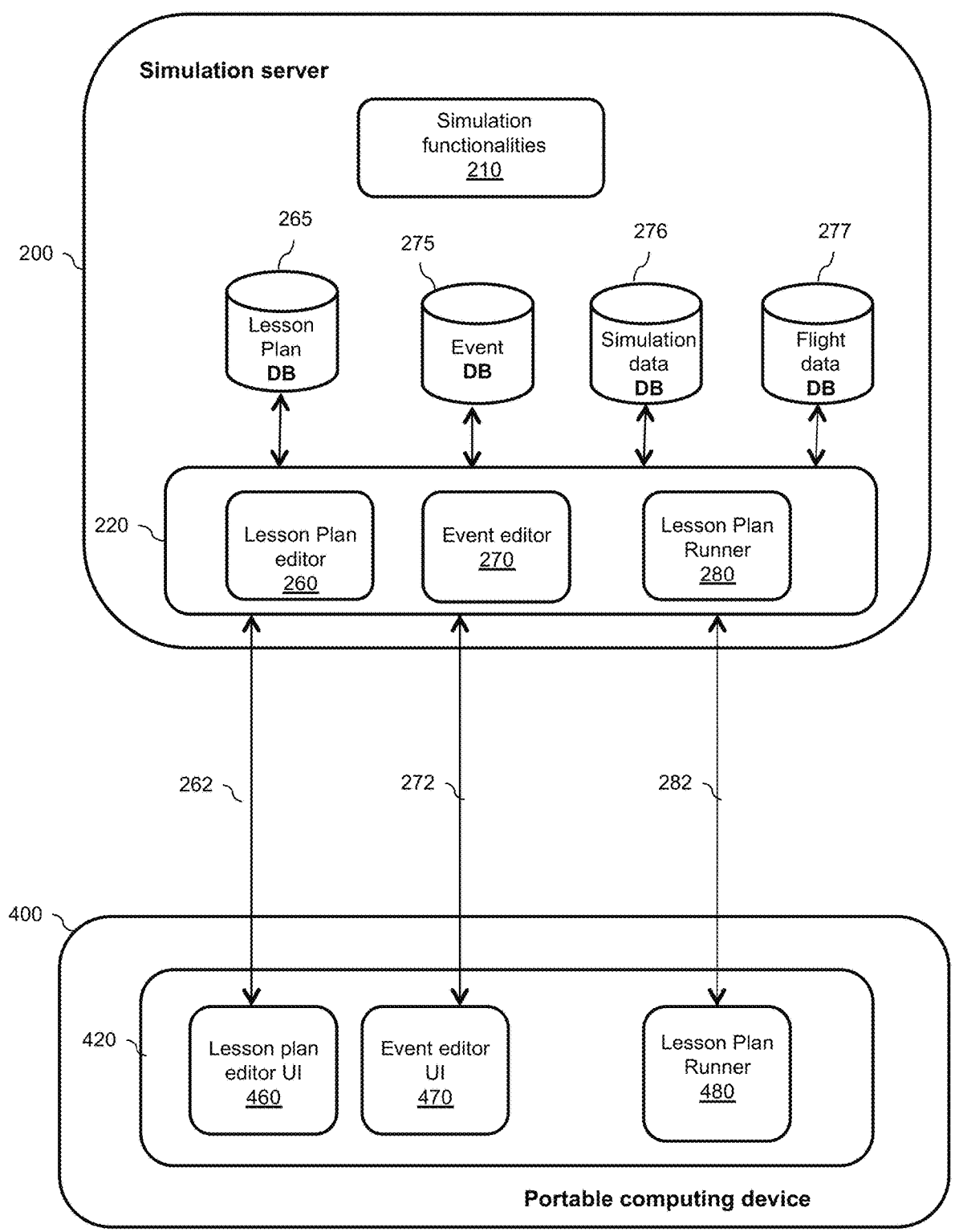
FIG. 7 illustrates components of a simulation server and portable computing device for defining and managing lesson plans and associated events.
Figure 11:
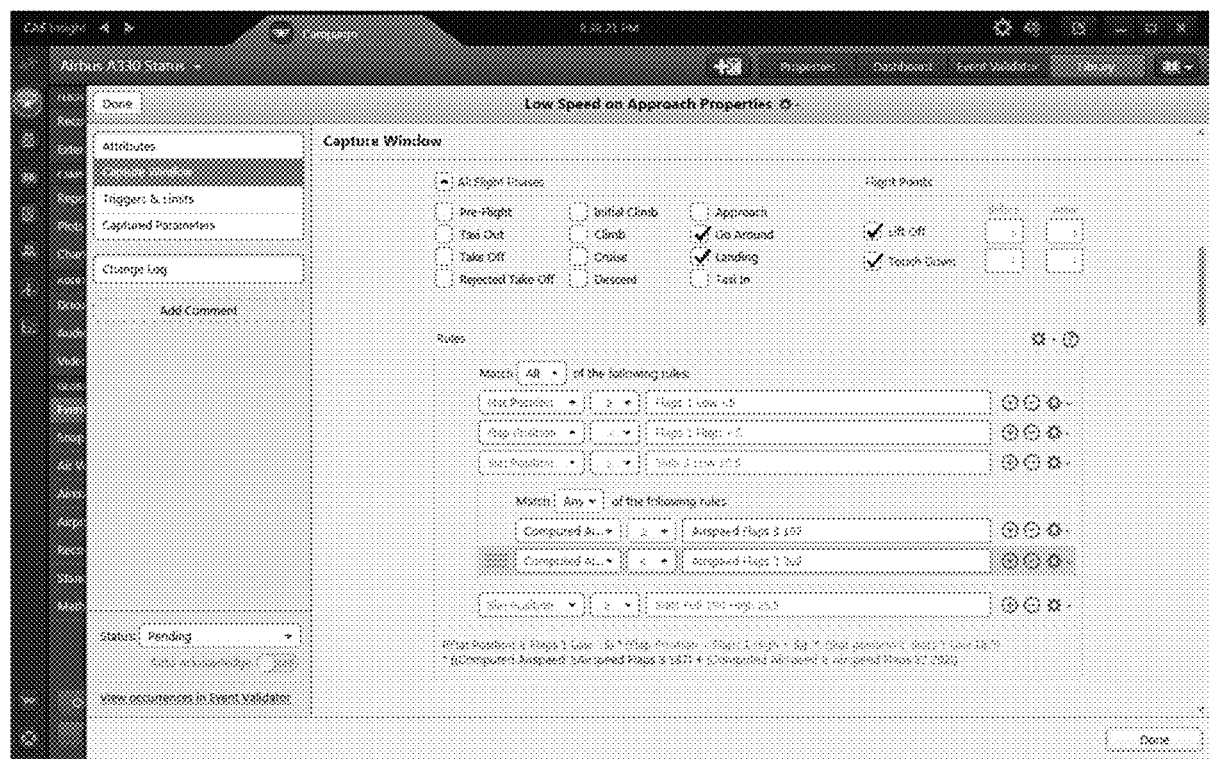
FIG. 11 represents a graphical user interface for event definition.

Reference is now made concurrently to FIGS. 7 and 11, where FIG. 7 illustrates components of a simulation server and portable computing device for defining and managing lesson plans and associated events, and FIG 11 graphically depicts an exemplary event editor user interface. The exemplary event depicted on FIG. 11 is related to 'Low Speed on Approach Properties'.

Each lesson plan comprises events, training points and Key Performance Indicator(s).

Each event may be edited and customized through a capture window of the event editor UI 470 by the user 10, as the exemplary event editor UI shown on FIG. 11. Each event may be linked to one or several phases of a simulation. For example, FIG. 11 shows an exemplary event editor UI for a flight simulator, where the phases offered for selection are displayed in the upper central section. In the particular example shown on FIG. 11, the phases presented relate to flight phases, i.e. pre-flight, taxi out, take-off, rejected take-off, initial climb, climb, cruise, descent, approach, go around, landing and taxi in. The phases provided in the event editor graphical user interface may vary based on the type of aircraft or type of application. For example, in the context of a civilian aircraft simulation, examples of phases may include takeoff, landing, high altitude flight, etc. In the context of a military aircraft simulation, additional phases may include low altitude flight, aircraft interception, missile escape maneuver, etc. Furthermore, some of the phases may be grouped to provide a subset of phases. For example, a subset of phases may include the following phases: descent, approach and landing.

Each event is composed of a set of rules, which can be predefined, and/or editable and/or customizable by the user 10. Examples of rules for the event 'Low Speed on Approach Properties' are depicted in the central portion of the exemplary event editor UI shown on FIG. 11. Each event may include a subset of rules that must all be met concurrently, a subset of rules where at least one rule must be met, or one or several independent rules.

Each rule, whether independent or in a subset, corresponds to a specific value or a range of values that are objectively validated and/or measured. Rules may also correspond to a sequence of actions taken by the user (e.g. the trainee). For example, if the rule consists of an action, that action must be measurable (and/or validated) in at least one way, such as for example: speed of execution of the action, delay before starting the action, intensity of the action, etc.

In the context of an aircraft simulation, examples of actions include: autopilot engaged, autopilot disengaged, flaps movements, altitude of the aircraft, speed of the aircraft, motor extinction, motor restart, fuel drop, etc. In the context of an aircraft simulation, examples of measurements include: altitude, bank angle, deviation from a glideslope path, deviation from a localizer path, tailwind, pitch angle, pitch rate, power setting, airspeed, etc.

Some rules may also be accompanied by a deviation value or a set of deviation values (e.g. low, medium and high). Each deviation value corresponds to a measurable and quantifiable measurement. Deviation value(s) is/are particularly useful as many events, rules and measurements are concurrently considered during execution of a simulation. Deviation value(s) allow to quickly identifying when the user 20 deviates while performing a simulation, and the magnitude of the deviation.

Deviation value(s) may also be set at the event level, instead of the rules level. The deviation value(s) at the event level may include subsets of deviation values corresponding to the rules. Thus, when executing a simulation, the user 10 may quickly assess when the user 20 starts to deviate during execution of an event. The deviation value(s) at the event level also allow faster troubleshooting when suggesting improvements to the user 20 performing the simulation.

Each event may also include defining a trigger for actuating the event. For example, when a specific measurement or set of measurements is met during a simulation being performed by the user 20 (e.g. the trainee), the simulation automatically initiates the event corresponding to the specific measurement or set of measurements, and the related rules. Triggers are particularly useful to ensure that when specific conditions are met, the corresponding event is initiated and the appropriate rules and measurements are applied and effectuated during the simulation.

Events are thus defined and/or customized by the user 10 (e.g. the instructor) so as to objectively evaluate the performance of the user 20 (e.g. the trainee) during a simulation. A simulation generally includes several events, but it would also be possible to include only one event to a simulation so as to target a simulation to a very specific aspect.

Examples of events associated to a landing phase and an initial approach could include: deployment of the speed breaks (example of a rule for assessing this step could be to have the speed breaks deployed by a certain delay from actuation of the event), measurement of the bank angle (the corresponding rule could be to have the bank angle below a given value), etc. Examples of events associated to a landing phase and a final approach could include: engagement of the autopilot (using a rule to validate the disengagement of the autopilot), measurement of the glideslope deviation (using a rule for measuring the glideslope deviation and ensuring that the glideslope deviation is below a given value or within any of a set of deviation values), etc. Examples of events associated to a landing phase and a landing could include: measurement of the tailwind (using a rule to verify that the tailwind measurement is below a given value), measurement of the pitch angle (using a rule to ensure that the measured pitch angle is within a given range), etc.

Each event may further be linked to one or several simulation points, which in the event editor UI 470 are depicted as lift off and touch down. The simulation points may further include a time definition, presented as a before time and after time on FIG. 11, which can be manually entered by the user 10 of the event editor UI 470.

Each lesson plan thus comprises one or several events, each event being composed of a set of rules and values and as required deviation values to be measured when triggered, during execution of a simulation.

The lesson plan also comprises one or several training points and Key Performance Indicators (KPIs). The training points may correspond to one or several events, to one or several rules of one or several events, and/or to specific values of some rules of one or several events, etc. Thus each event is used to monitor particular aspects of the execution of the simulation, while each training point is used to evaluate the user 20's performance during execution of particular aspects of the simulation.

KPIs may be associated to one or several rules, to one or several events, to one or several training points, or to a combination thereof. The KPIs are used to objectively evaluate specific aspects of a performance of the user 20 performing the simulation or an overall performance of the user 20 performing the simulation.

Lesson plans are configured by the user 10 (e.g. the instructor) by means of a lesson plan editor user interface (UI) 460 discussed further. The lesson plan editor UI 460 is part of the IOS UI 420 previously discussed. The lesson plan editor UI 460 may comprise an event editor user interface (UI) 470 as shown on FIG. 7, or the event editor user interface UI 470 may be run separately from the lesson plan editor UI 460 in the IOS UI 420 on the portable computing device 400, as shown on FIG. 7.

The server IOS UI 220 includes a lesson plan editor functionality 260 and an event editor functionality 270. The lesson plan editor functionality 260 and the event editor functionality 270 may run as separate functionalities in the server IOS UI 220, or be integrated into a single functionality (not shown).

The lesson plan editor UI 460 allows the instructor to interact with the lesson plan editor 260 executed by the simulation server 200. A plurality of instances of lesson plan editor 260 can be executed in parallel by the processing unit 201 of the simulation server 200, for allowing a plurality of instructors to respectively interact with various instances of the lesson plan editor 260, via their respective portable computing device lesson plan editor UI 460. The lesson plan editor UI 460 may also be implemented on the simulator 300, although not shown on the Figures.

The server lesson plan editor 260 is executed by the processing unit 201 of the simulation server 200. The portable computing device lesson plan editor UI 460 is executed by the processing unit 401 of the portable computing device 400. Lesson plan data 262 are exchanged between the server lesson plan editor 260 and the portable computing device lesson plan editor UI 460. The exchange of lesson plan data 262 can be performed via the web server function 250 of the simulation server 200 and the web client function 450 of the portable computing device 400, in a manner similar to the exchange of IOS interaction 222 data which has been detailed previously in the description.

The portable computing device lesson plan editor UI 460 implements a display function (not represented in FIG. 7) for displaying on the display 404 of the portable computing device 400 lesson plan data 262 received from the server lesson plan editor 260. The portable computing device lesson plan editor UI 460 also implements an interaction function (not represented in FIG. 7) for allowing the instructor to provide lesson plan data 262 via the user interface(s) 405 of the portable computing device 400, and for transmitting these lesson plan data 262 to the server lesson plan editor 260.

The following steps illustrate exemplary interactions of the instructor (user 10) with the server lesson plan editor 260 via the portable computing device lesson plan editor UI 460.

The portable computing device lesson plan editor 260 transmits lesson plan data 262 comprising the operations that the instructor is authorized to perform (for example creation, viewing, modification, etc. of lesson plans).

The portable computing device lesson plan editor UI 460 transmits lesson plan data 262 comprising the selected operation (for example creation of a new lesson plan).

The server lesson plan editor 260 transmits lesson plan data 262 comprising a list of the types of lesson plans which can be created (e.g. different types of lesson plans corresponding to different types of aircrafts, for instance civil or military).

The portable computer device lesson plan editor UI 460 transmits lesson plan data 262 comprising the selection of the type of lesson plan (e.g. lesson plan for simulation a particular type of military aircraft).

The server lesson plan editor 260 transmits lesson plan data 262 comprising a list of corresponding predetermined events.

The instructor selects (via the portable computing device lesson plan editor UI 460) one or more events for configuration and/or customization through the event editor UI 470. For example, if the lesson plan targets advanced trainees, the values associated with the rules of the event may be optimized, and or the deviation value(s) reduced.

The portable computing device lesson plan editor UI 460 transmits lesson plan data 262 comprising the edited events through the event editor UI 470 to the lesson plan editor 260. In a particular aspect, the event editor UI 470 may transmit directly 272 to the event editor 270 of the simulation server 200 the modified events (e.g. rules, values, deviation values, phases).

The lesson plan comprising the edited events is stored by the server lesson plan editor 260 in a lesson plan database (DB) 265. The lesson plan database 265 can be implemented at the simulation server 200, or can be implemented on a remote database server. The lesson plan database 265 is for illustration purposes only. The created lesson plan can be stored via any storage means known in the art.

The lesson plan database 265 stores lesson plans that have been created and edited. An instructor may be authorized or not to view, modify, use lesson plans created by another instructor. The lesson plan database 265 also stores the operations that each registered instructor is authorized to perform, the types of lesson plans which can be created, the list of events and rules, etc. Furthermore, the lesson plan database 265 also stores the occurrences of use of a particular lesson plan for performing a simulation. For each occurrence of use, an identification of the instructor and of the trainee(s) who participated to the simulation is also stored, along with relevant information about the simulation session itself (i.e. edited events, rules, training points and KPIs).

The user 10 (e.g. the instructor) can select (if authorized to) one of the lesson plans stored in the lesson plan database 265 for viewing only, or for modification (e.g. adding/removing/modifying an event to the lesson plan, adding or removing or modifying a rule of an event, etc.). Alternately, the user 10 (e.g. the instructor) can create (if authorized to) a new lesson plan to be stored in the lesson plan database 265 by adding/removing/modifying event(s) to the new lesson plan, adding or removing or modifying rule(s) of the event(s), adding and configuring training point(s), and adding and configuring KPIs, etc.). The exchanges of lesson plan data 262 between the portable computing device lesson plan editor UI 460 and the server lesson plan editor 260 for viewing/modifying/creating lesson plans is performed any known data protocol such as for example Internet protocol.

The simulation server 200 also implements a server event editor 270 for creating events, viewing existing events, modifying existing events, etc. As shown on FIG. 7, the server event editor 270 may be integrated within the server lesson plan editor 260, or implemented separately thereof (not shown).

The portable computing device event editor UI 470 allows the user 10 (e.g. the instructor) to interact with the server event editor 270 either directly 272 or through the portable computing device lesson plan editor UI 460 and the server lesson plan editor 260. A plurality of instances of server event editors 270 can be executed in parallel by the simulation server 200, for allowing a plurality of instructors to respectively interact with a particular instance of the server event editor 270, via the portable computing device event editor UI 470 of each portable computing device 400. The portable computing device event editor UI 470 may also be implemented on the simulator 300 although not shown on the Figures.

The server event editor 270 is executed by the processing unit 201 of the simulation server 200. The portable computing device event editor UI 470 is executed by the processing unit 401 of the portable computing device 400. Event data 272 may be exchanged directly between the server event editor 270 and the portable computing device event editor UI 470 via the web server function 250 of the simulation server 200 and the web client function 450 of the portable computing device 400, in a manner similar to the exchange of IOS data, which has been described previously.

The portable computing device event editor UI 470 implements a display function (not represented in FIG. 7) for displaying on the display 404 of the portable computing device 400 event data 272 received from the server event editor 270 either directly or through the server lesson plan editor 260 and the portable computing device lesson plan editor UI 460. The portable computing device event editor UI 470 also implements an interaction function (not represented in FIG. 7) for allowing the instructor to provide event data 272 via the user interface(s) 405 of the portable computing device 400, and for transmitting these event data 272 to the server event editor 270.

The event database (DB) 275 stores default and customized events for facilitating creation and editing of lesson plans by the user 10 (e.g. the instructor). For example, the event DB 275 stores the default events available per type of user 20 (e.g. the trainee), such as beginner/intermediate/advanced. The event DB 275 further stores the customized events corresponding to a specific instructor, a specific trainee, to a specific aircraft, to a particular training point, etc.

The event database 275 can be implemented at the simulation server 200, or can be implemented on a remote database server. The event database 275 is for illustration purposes only. The created events can be stored via any storage means known in the art.

Instead of having an independent event database 275, all the information stored in the event database 275 may be stored in the lesson plan database 265. Additionally, the server event editor functionality 270 may be directly integrated in the server lesson plan editor functionality 260, and the portable computing device event editor UI 470 may be directly integrated in the portable computing device lesson plan editor UI 460.

Lesson Plan Runner

The simulation server 200 further implements a server lesson plan runner functionality 280 for triggering and controlling the execution of the simulation functionalities 210 required to perform a simulation according to a selected lesson plan. The portable computing device 400 implements a portable computing device lesson plan runner UI 480, for allowing the user 10 (e.g. the instructor) to interact with the server lesson plan runner 280. The lesson plan runner UI 480 may also be implemented on the simulator 300 although not shown on the Figures.

A plurality of instances of server lesson plan runner 280 can be executed in parallel by the simulation server 200, for allowing a plurality of simulations to be executed according to a plurality of lesson plans concurrently. The execution of a plurality of simulations by the simulation server 200 has been detailed previously in the description. Thus, a plurality of users 10 (e.g. instructors) may respectively interact with the server lesson plan runner 280, via their respective portable computing device lesson plan runner UI 480.

The server lesson plan runner 280 is executed by the processing unit 201 of the simulation server 200. The portable computing device lesson plan runner UI 480 is executed by the processing unit 401 of the portable computing device 400. Lesson plan control data 282 are exchanged between the server lesson plan runner 280 and the portable computing device lesson plan runner UI 480. The exchange of lesson plan control data 282 can be performed via the web server function 250 and the portable computing device web client function 450, in a manner similar to the exchange of IOS data 222 which has been already described.

The portable computing device lesson plan runner UI 480 implements a display function (not represented in FIG. 8) for displaying on the display 404 of the portable computing device 400 lesson plan control data 282 received from the server lesson plan runner 280. The portable computing device lesson plan runner UI 480 also implements an interaction function for allowing the user 10 (e.g. the instructor) to provide lesson plan control data 282 via the user interface(s) 405 of the portable computing device 400, and for transmitting the lesson plan control data 282 to the server lesson plan runner 280.

The following steps illustrate exemplary interactions of the user 10 (e.g. the instructor) with the server lesson plan runner 280 via the portable computing device lesson plan runner UI 480.

The server lesson plan runner 280 transmits lesson plan control data 292 comprising a list of available lesson plans stored in the server lesson plan database 265. The list of available lesson plans only contains lesson plans that the instructor currently using the portable computing device lesson plan runner UI 480 is authorized to use. The list of available lesson plans may be determined based on filtering criteria provided by the user 10 (e.g. the instructor) via the portable computing device lesson plan runner UI 480 (e.g. lesson plan for civil aircrafts only, lesson plans for military aircrafts only, lesson plans for a particular type of aircraft, etc.), or via the server lesson plan runner 280 based on the credentials of the user 10 (e.g. the instructor) stored at the simulation server 200.

The user 10 (e.g. the instructor) selects, via the portable computing device lesson plan runner UI 480, one among the list of available lesson plans. The server lesson plan runner 280 may also transmit additional information for each available lesson plan, which are displayed by the portable computing device lesson plan runner UI 480 for helping the instructor to make the selection. For example, the additional information includes for each available lesson plan: the list of events, the list of training points and the list of KPIs. The portable computing device lesson plan runner UI 480 transmits lesson plan control data 282 comprising the selected lesson plan to the server lesson plan runner 280.

The server lesson plan runner 280 transmits information related to the selected lesson plan to the simulation functionalities 210. The information includes the corresponding events, the training points and KPIs.

The server lesson plan runner 280 further monitors the execution of corresponding server simulation functionalities 210. For this purpose, the server lesson plan runner 280 uses a mapping between the available server simulation functionalities 210, and the selected and configured events. The mapping indicates which of the server simulations functionalities 210 shall be used for implementing a particular event or rule of an event of a given type of lesson plan. For instance, the server simulation functionalities 210 used for the initial approach step of the landing phase of a lesson plan for a civil aircraft may differ from the server simulation functionalities 210 used for the initial approach step of the landing phase of a lesson plan for a military aircraft. The mapping can be stored in the server lesson plan database 265, or in another component of the server simulation server 200.

The execution of the simulation and monitoring thereof is thus performed according the selected lesson plan. The server lesson plan runner 280 transmits lesson plan control data 282 including information related to the course of the simulation to the portable computing device lesson plan runner UI 480. The information is displayed by the portable computing device lesson plan runner UI 480 to inform the user 10 (e.g. the instructor) of the course of the simulation.

The user 10 (e.g. the instructor) may control the course of the simulation via interactions with the portable computing device lesson plan runner UI 480. For example, the instructor can temporarily pause (and later resume) the execution of the simulation. The instructor can also replay completed instances of the course of the simulation. The instructor can also go back to previous instances of the course of the simulation. The portable computing device lesson plan runner UI 480 transmits lesson plan control data 282 comprising instructions for controlling the course of the simulation (e.g. pause/resume, replay, go back, etc.) to the server lesson plan runner 280 via the portable computing device web interface 450 and the web server interface 250, as previously discussed. The instructions for controlling the course of the simulation are transmitted to the server lesson plan runner 280, which interacts with the server simulation functionalities 210 for effectively enforcing the instructions for controlling the course of the simulation received from the portable computing device lesson plan runner 480.

During the execution of the simulation, the server lesson plan runner 280 collects simulation data from the server simulation functionalities 210. The collected simulation data are used to determine if the events, the training points and the KPIs have been met.

Reference in now made to the previously mentioned examples of events associated to a landing phase and an initial approach step. If the event is the deployment of the speed breaks and the corresponding KPI is to have the speed breaks deployed by a certain time, the collected simulation data include the occurrence of the deployment of the speed breaks during the execution of the server simulation functionalities 210, and the time at which the occurrence happened. If an occurrence of the deployment of the speed breaks is detected before the specified time, the KPI is met, otherwise the KPI is not met. If the event is the measurement of the bank angle and the corresponding KPI is to have the bank angle below a given value, the collected simulation data include the value of the bank angle during the execution of the server simulation functionalities 210. If the value of the bank angle remains below the given value, the KPI is met, otherwise the KPI is not met.

Reference in now made to the previously mentioned examples of events associated to a landing phase and a final approach step. If the event is the engagement of the autopilot and the corresponding KPI is to have the autopilot not engaged at this step, the collected simulation data include the occurrence of the autopilot being engaged during the execution of the server simulation functionalities 21. If an occurrence of the autopilot being engaged is detected, the KPI is not met, otherwise the KPI is met.

Figure 8:
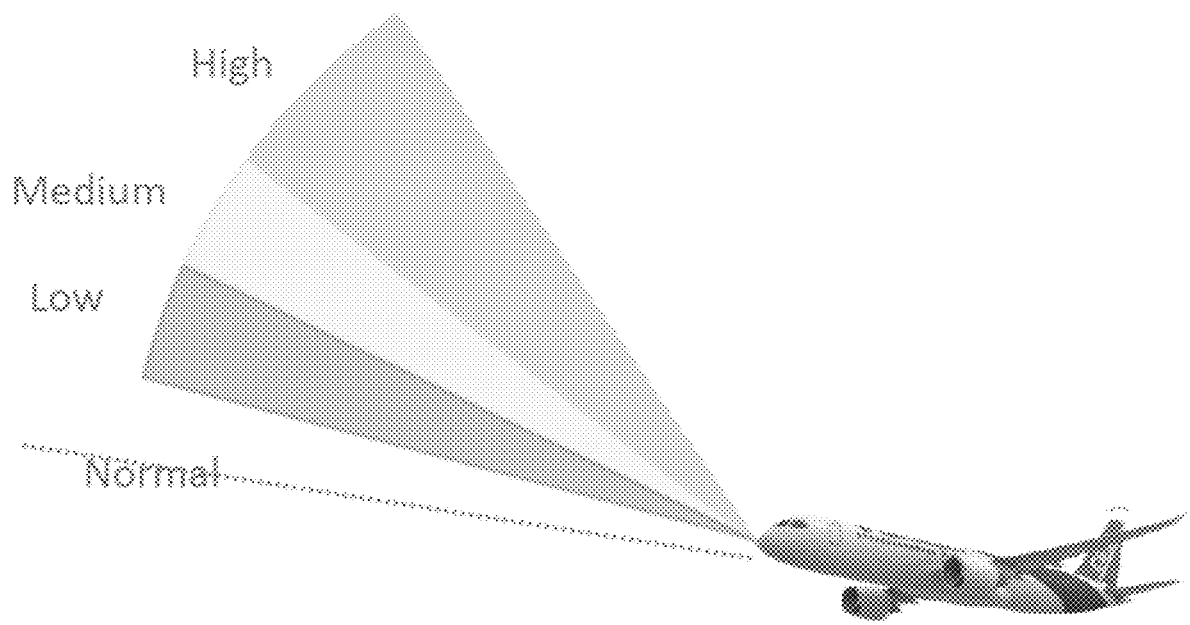
FIG. 8 illustrates a KPI assigned to an event consisting of a pitch angle measurement.

FIG. 8 illustrates another example where the event relates to pitch angle during takeoff. One rule of the event relates to the measurement of the pitch angle. The corresponding KPI is to have the pitch angle below a maximal value. The KPI is also accompanied by three sets of deviation values: a low deviation range, a medium deviation range, and a high deviation range. The maximal value is the lower value of the low deviation range. The collected simulation data include the value of the pitch angle during the execution of the server simulation functionalities 210.

If the value of the pitch angle remains below the maximal value (e.g. normal value in FIG. 8), the KPI is met. If the value of the pitch angle is within the low deviation range, the KPI is not met with a rating set to low deviation. If the value of the pitch angle is within the medium deviation range, the KPI is not met with a rating set to medium deviation. If the value of the pitch angle is within the high deviation range, the KPI is not met with a rating set to high deviation.

In a particular aspect, the portable computing device lesson plan runner UI 480 displays a visual representation (e.g. 2D image, 3D image, a curve, etc.) of the execution of the simulation corresponding to the lesson plan.

Figure 9:
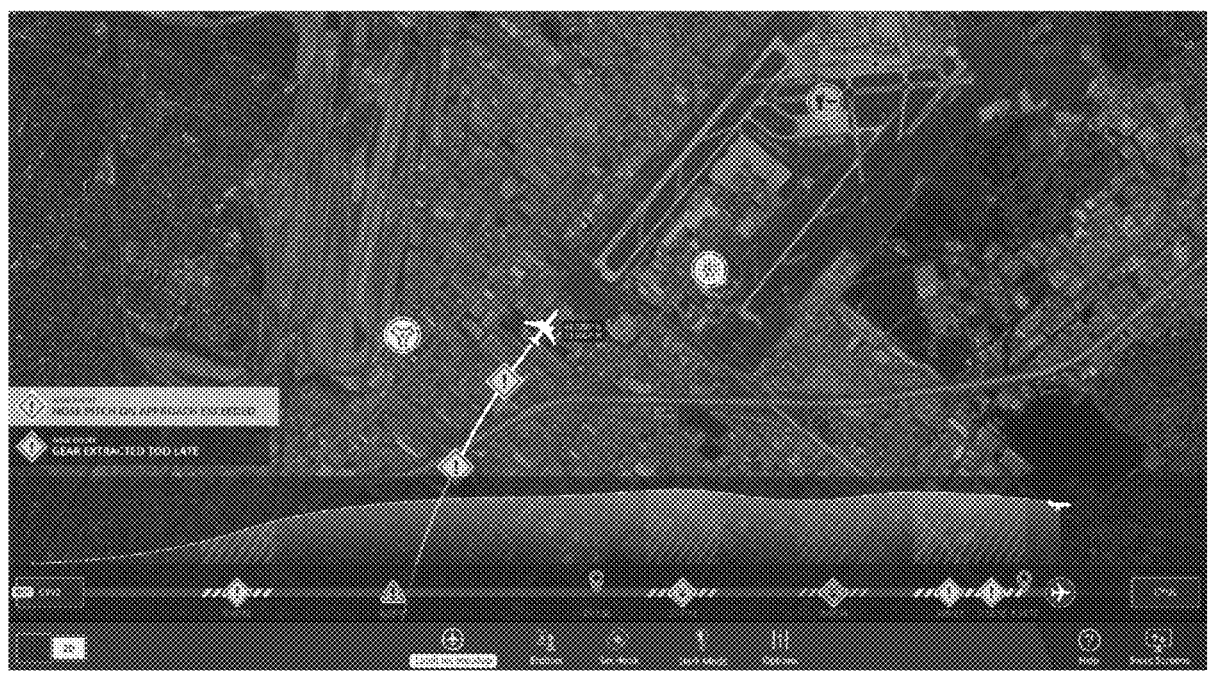
FIGS. 9 and 10 represent visual alarms or prediction indicators associated to an event being displayed on a visual representation of the execution of a simulation.

For example, FIG. 9 illustrates a 2D map of an aircraft and an airport during a final approach step of a landing phase. Although a 2D map is represented, a 3D map may be used as well.

Figure 10:
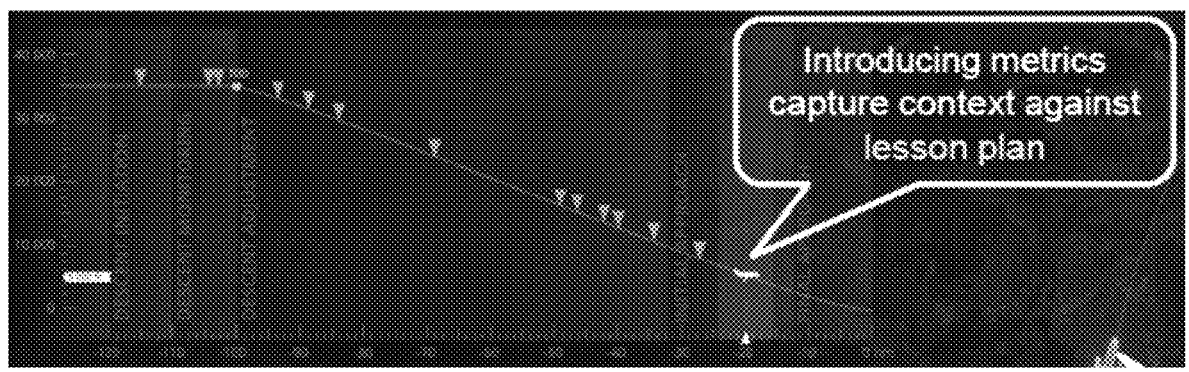

In another example, FIG. 10 illustrates a logical representation of an aircraft during an initial approach step of a landing phase, where the altitude (vertical axis) of the aircraft is represented against time (horizontal axis).

The data for generating the visual representation of the execution of the simulation are generated by the server lesson plan runner 280 (based on simulation data collected from the server simulation functionalities 210), and transmitted directly to the portable computing device lesson plan runner UI 480. Alternatively, the data for generating the visual representation of the execution of the simulation may be generated directly by the server simulation functionalities 210, and transmitted to the portable computing device lesson plan runner UI 480.

During the execution of the simulation, if the server lesson plan runner 280 detects that one of the KPIs for the current lesson plan is not met, a visual alarm is displayed on the visual representation of the execution of the simulation displayed by the portable computing device lesson plan runner UI 480.

In a first embodiment, integrated visual data including the visual representation of the execution of the simulation and the visual alarm are generated by the server lesson plan runner 280, and the portable computing device lesson plan runner UI 480 simply displays the integrated visual data. In another embodiment, the server lesson plan runner 280 transmits information related to the visual alarm to the portable computing device lesson plan runner UI 480, which uses the information related to the visual alarm to integrate the visual alarm to the already displayed visual representation of the execution of the simulation.

FIG. 9 illustrates visual alarms represented in the form of diamond shapes displayed on the trajectory of the plane in the 2D map. The position of a particular visual alarm on the trajectory of the plane is indicative of the moment when the alarm was raised. For instance, one of the visual alarms corresponds to an occurrence of the autopilot being engaged, which is not supposed to occur during a final approach step of a landing phase.

FIG. 10 illustrates visual alarms represented in the form of triangle shapes displayed on the curve representing the altitude of the aircraft versus time. The position of a particular visual alarm on the curve is indicative of the moment when the alarm was raised. For instance, one of the visual alarms corresponds to an occurrence of a failure to have the speed breaks deployed by a certain time of an initial approach step of a landing phase.

In another particular aspect, at least some of the events comprise a prediction metric. The prediction metric is a value or a range of values representing an early indicator that one or a group of KPI of event(s) is/are at risk of not being met.

If the KPI consists in an occurrence of an event before a certain delay, the prediction metric is a shorter delay. For example, if the KPI is to have the speed breaks deployed by 30 seconds within an initial approach step of a landing phase, then the prediction metric is set to a lower value such as for example 25 seconds (if the speed breaks are not deployed at 25 seconds, there is a risk that they will not be deployed at 30 seconds).

If the KPI consists in a measurement being above/below a specific value or being within a given range, the prediction metric is set to a corresponding value or range of values that are indicative of the KPI not being met, before the KPI set values are reached. For example, if the KPI is to have the pitch angle within 20 to 30 degrees during a landing step of a landing phase, then the prediction metric is being for example a pitch angle above 40 degrees (if the pitch angle is above 40 degrees, there is a risk that the pitch angle will not be within the 20 to 30 degrees range).

The simulation data collected by the server lesson plan runner 280 are also used to determine if the prediction metrics for the events defined for the lesson plan have been met.

During the execution of the simulation corresponding to the lesson plan, if the server lesson plan runner 280 detects that the prediction metric of one event defined for the lesson plan is met, a visual prediction indicator is displayed on the visual representation of the execution of the simulation displayed by the portable computing device lesson plan runner UI 480. The generation and display of the visual prediction indicator is similar to the previously described generation and display of a visual alarm. The visual prediction indicator and visual alarm have different shapes and/or different colors to be easily identified by an instructor. For example, in FIG. 9, the visual alarms consist in red diamond shapes, while the visual prediction indicators consist in yellow diamond shapes. In FIG. 10, the visual alarms consist in red triangle shapes, while the visual prediction indicators consist in yellow triangle shapes.

If a visual prediction indicator corresponding to an event is displayed (e.g. a yellow triangle shape), but the KPI of the event is finally met at some later point in the simulation, the visual aspect of the prediction indicator may be changed (e.g. to a green triangle shape) to indicate that it was not fatal to meeting the KPI of the event, or the visual prediction indicator may be removed from the display of the portable computing device.

The visual alarms and visual prediction indicators convey minimal information, and may not even allow the identification of the corresponding events. Thus, the instructor may interact with a particular visual alarm or visual prediction indicator via the portable computing device lesson plan runner UI 480 (e.g. select a particular visual alarm or prediction indicator via a mouse, a trackpad, a touch screen, etc.) to obtain more information about the corresponding event (e.g. display by the server lesson plan runner UI 280 for identifying the event, KPI to be met, corresponding prediction metric, etc.).

In still another particular aspect, the server lesson plan runner 280 transmits information related to the visual alarms and prediction indicators to the portable computing device IOS UI 420. The portable computing device IOS UI 420 uses the information related to the visual alarms and prediction indicators to integrate the visual alarms and prediction indicators to an already displayed visual representation of the execution of the simulation. The operations of the portable computing device IOS UI 420 have been detailed previously. In particular, the portable computing device IOS UI 420 may be displaying a 2D map or a 3D map, and the visual alarms and prediction indicators are integrated to a representation of the execution of the simulation in the 2D or 3D map at a position on the map where the alarm or prediction indicator was detected.

Automatic Generation of Events

Reference is now made concurrently to FIGS. 3A, 3B, 3C and 7.

A simulation data database 276 represented in FIG. 7 stores simulation data. The simulation data database 276 is implemented at the simulation server 200, or can be implemented on a remote database server. The simulation data database 276 is for illustration purposes only. The simulation data can be stored via any storage means known in the art.

During the execution of a simulation in accordance with a selected lesson plan, the server lesson plan runner 280 collects simulation data from the server simulation functionalities 210. The collected simulation data are used to determine if the KPIs and training points have been met. At least some of the simulation data collected by the server lesson plan runner 280, along with the corresponding events and related KPIs and training points, are stored in the simulation data database 276.

If the event is an action (e.g. deployment of the speed breaks) and the corresponding KPI is to have the action performed by a certain time, the time of occurrence of the action is stored in the simulation data database 276. If the action is not performed, the non-occurrence of the action is also stored in the simulation data database 276.

If the event is the measurement of a parameter (e.g. bank angle) and the corresponding KPI is to have the value of the parameter within a defined range, the variations of the parameter during the simulation are stored in the simulation data database 276.

The simulation data stored in the simulation data database 276 are collected for a plurality of simulations, performed under the supervision of a plurality of instructors, by a plurality of trainees. Additional information can be collected and stored. For example, the simulations corresponding to the landing phase and takeoff phase may be performed with events specifically defined for a particular airport (e.g. Montreal, Dallas, etc.). In this case, the simulation data collected during the landing phase and takeoff phase are indexed with an identification of the airport when stored in the simulation data database 276, so that statistics may be generated later for each specific airport.

A flight data database 277 represented in FIG. 7 stores flight data. The flight data database 277 is implemented at the simulation server 200, or can be implemented on a remote database server. The flight data database 277 is for illustration purposes only. The flight data can be stored via any storage means known in the art.

The information in the flight data database 277 is similar to the information in the simulation data database 276, but the information in the flight data database 277 has been recorded on real airplanes during real flights. The flight data include information recorded during a standard flight, and may also include information recorded on a black box when an airplane has crashed. The information stored in the flight data database 277 can be transmitted to the simulation server 200 via its communication interface 203.

The information in the simulation data database 276 and flight data database 277 is organized by events. A big data functionality processes the information for each event to generate simulation data statistics and flight data statistics. The big data functionality is executed by the processing unit 201 of the simulation server 200. For instance, the big data functionality can be integrated to the server lesson plan runner 280 or the server event editor 270.

The server event editor 270 uses the information of the simulation data database 276 and flight data database 277 to automatically create events associated to a specific event. The automatic creation is based on the simulation data statistics and flight data statistics for the specific event.

The automatic creation includes automatically selecting one or more rules and automatically providing values, and suggested KPIs. Via the portable computing device event editor UI 470, the user 10 (e.g. the instructor) can select/remove some of the automatically presented events, modify some of the values provided for rules related to the events, introduce KPIs or modify automatically generated KPIs, manually create an additional event and KPIs, manually create a new event and let the server event editor 270 automatically provide values for the corresponding rules, etc.

For example, for a specific lesson plan, the simulation data statistics include the top N (e.g. top 5) events used during simulations of similar lesson plans performed by the simulation server 200. The top N events are automatically added to the specific lesson plan by the server event editor 270.

In another example, for a specific lesson plan, the simulation data statistics include the top N (e.g. top 5) failed events during simulations of the specific lesson plan performed by the simulation server 200. A failed event is an event for which the corresponding KPI has not been met. The top N failed events are automatically added to the specific lesson plan by the server event editor 270.

In still another example, the KPI associated to an event of a lesson plan, created manually by the instructor via the portable computing device event editor UI 470 or created automatically by the server event editor 270, is automatically generated by the server event editor 270, based on the simulation data statistics.

For instance, if the event is an action (e.g. deployment of the speed breaks) and the corresponding KPI is to have the action performed by a pre-defined time, the pre-defined time and the effective time of occurrence of the action have been stored in the simulation data database 276. The pre-defined time for the automatically generated KPI can be the average of all the pre-defined times stored in the simulation data database 276. The pre-defined time for the automatically generated KPI can also be the average of all the pre-defined times stored in the simulation data database 276, adjusted by a value computed based on all the effective times of occurrence stored in the simulation data database 276.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A simulation server comprising:
   memory for storing simulation data; and
   a processing unit for:
   executing a plurality of simulations functionalities according to a lesson plan that generates simulation data representative thereof;
   collecting the simulation data representative of the execution of the plurality of simulations functionalities according to the lesson plan, wherein the simulation data include user interactions received from a user at a simulator for controlling, in real-time, execution of the simulation;
   storing the simulation data in the memory;
   processing the simulation data to generate simulation data statistics; and
   creating at least one event having at least one rule based on the simulation data statistics, the at least one rule comprising at least one measurable value to be measured by at least one of the simulation functionalities.

2. The simulation server of claim 1, wherein the at least one measurable value comprises one of the following: an action, a measurement, and a combination thereof.

3. The simulation server of claim 2, wherein the rule comprises the action and the rule is met once the action has been performed.

4. The simulation server of claim 2, wherein the measurement comprises one of the following: a measurement of a simulation parameter, a measurement of a time to perform an action, and a measurement of a delay between two consecutive actions.

5. The simulation server of claim 4, wherein the measurement comprises a specific value or a specific range of values.

6. The simulation server of claim 1, wherein the lesson plan comprises at least one event, at least one rule to be measured or verified for the event, and at least one value for the rule to be measured or verified.

7. The simulation server of claim 6, wherein the lesson plan comprises at least one created event based on the simulation data statistics.

8. The simulation server of claim 7, wherein the created events comprise top N events based on the rate of occurrence in the simulation data statistics.

9. The simulation server of claim 8, wherein the created events comprise the top N failed events among the plurality of events of the simulation data, a failed event comprising an event for which the corresponding rule has not been met during the execution of a simulation.

10. The simulation server of claim 7, wherein the created event further comprises a created objective comprises the average of the objectives associated to the particular event among the simulation data.

11. The simulation server of claim 10, wherein the created objective is adjusted by a value computed based on the values of the particular event among the simulation data.

12. The simulation server of claim 1, wherein the simulation functionalities simulate, when executed, operation of an aircraft.

13. The simulation server of claim 12, wherein:
the memory also stores flight data collected from a plurality of aircrafts; and
the processing unit processes the flight data to:
generate flight data statistics; and
create at least one event based on the flight data statistics.

* * * * *